US009798355B2

United States Patent
Xu

(10) Patent No.: US 9,798,355 B2
(45) Date of Patent: Oct. 24, 2017

(54) PROJECTION METHOD AND ELECTRONIC DEVICE

(71) Applicant: Lenovo (Beijing) Co., Ltd., Beijing (CN)

(72) Inventor: Ben Xu, Beijing (CN)

(73) Assignee: Lenovo (Beijing) Co., Ltd., Beijing (CN)

( * ) Notice: Subject to any disclaimer, the term of this patent is extended or adjusted under 35 U.S.C. 154(b) by 57 days.

(21) Appl. No.: 14/674,605

(22) Filed: Mar. 31, 2015

(65) Prior Publication Data

US 2016/0154534 A1 Jun. 2, 2016

(30) Foreign Application Priority Data

Dec. 2, 2014 (CN) .......................... 2014 1 0723205
Dec. 15, 2014 (CN) .......................... 2014 1 0778819

(51) Int. Cl.
*G06F 1/16* (2006.01)
*G06F 3/042* (2006.01)
*G10L 15/00* (2013.01)

(52) U.S. Cl.
CPC .......... *G06F 1/1626* (2013.01); *G06F 1/1639* (2013.01); *G06F 3/0425* (2013.01); *G06F 2203/04803* (2013.01); *G10L 15/00* (2013.01)

(58) Field of Classification Search
CPC .. G06F 3/0428; G06F 3/04883; G06F 3/0425; G06F 1/1626; G06F 1/1639; G06F 2203/04803; G10L 15/00
See application file for complete search history.

(56) References Cited

U.S. PATENT DOCUMENTS

| 8,448,088 | B2 | 5/2013 | Kikuchi et al. |
| 9,035,971 | B2 | 5/2015 | Aoki |
| 2009/0085828 | A1 | 4/2009 | Lee et al. |
| 2010/0017745 | A1 | 1/2010 | Kikuchi et al. |
| 2012/0040716 | A1* | 2/2012 | Kuncl ............ G03B 21/14 455/556.1 |
| 2013/0181905 | A1* | 7/2013 | Chiang ........... G06F 3/04883 345/168 |
| 2013/0207998 | A1 | 8/2013 | Aoki |
| 2014/0292724 | A1 | 10/2014 | He |

(Continued)

FOREIGN PATENT DOCUMENTS

| CN | 101630227 A | 1/2010 |
| CN | 103248849 A | 8/2013 |

(Continued)

OTHER PUBLICATIONS

First Chinese Office Action regarding Application No. 201410723205.2 dated Feb. 28, 2017. English translation provided by http://globaldossier.uspto.gov.

(Continued)

*Primary Examiner* — Aneeta Yodichkas
(74) *Attorney, Agent, or Firm* — Harness, Dickey & Pierce, P.L.C.

(57) ABSTRACT

A projection method and an electronic device are provided. The method includes: projecting a first projection content from a first projection unit; determining at least one second projection unit of the electronic device in the presence of a first operation; and projecting the first projection content from the at least one second projection unit.

10 Claims, 14 Drawing Sheets

(56) References Cited

U.S. PATENT DOCUMENTS

2014/0347295 A1* 11/2014 Kim .................. G06F 1/163
                                                      345/173
2015/0205374 A1   7/2015 Yao et al.

FOREIGN PATENT DOCUMENTS

| CN | 103744515 A | 4/2014 |
| CN | 103777755 A | 5/2014 |
| CN | 104049720 A | 9/2014 |
| CN | 104077101 A | 10/2014 |

OTHER PUBLICATIONS

First Chinese Office Action regarding Application No. 201410778819.0 dated Apr. 14, 2017. English translation provided by Unitalen Attorneys at Law.

* cited by examiner

PROJECTION METHOD AND ELECTRONIC DEVICE

CROSS-REFERENCES TO RELATED APPLICATIONS

The present application claims priority to Chinese Patent Application 201410723205.2, entitled "INFORMATION PROCESSING METHOD AND ELECTRONIC DEVICE", filed with the Chinese State Intellectual Property Office on Dec. 2, 2014, the priority to Chinese Patent Application No. 201410778819.0, entitled "PROJECTION METHOD AND ELECTRONIC DEVICE", field with the Chinese State Intellectual Property Office on Dec. 15, 2014, which are incorporated herein by reference in their entireties.

TECHNICAL FIELD

The disclosure relates to the field of projection technologies, and in particular to a projection method and an electronic device.

BACKGROUND

With the continuous development of science and technology, the electronic technology is developed rapidly, and more and more types of the electronic products occur. The technology development brings various conveniences for people, and presently the people can enjoy a comfortable life brought with the technology development by using various electronic devices.

For example, for the convenience of multiple users to view the content displayed on the electronic device simultaneously, a projection device with a projection function is developed, such as a projector, a mobile phone with the projection function. When viewing the content displayed on the electronic device, the user may desire to adjust a projection region for the projection content due to some reasons, for example, the user may desire to adjust the projection content projected on the left front side of the projection device to be projected on the right front side of the projection device, or another example, the user may desire to adjust the projection content projected on the left side of the mobile phone to be projected on the right side of the mobile phone during the polyhedral projection using the mobile phone. In the conventional technology, in the case of the adjustment described above, generally the user is required to operate the projection device directly, for example, adjust the position angle of the projection device, or perform operations such as a pressing operation or rotating operation on some buttons of the projection device.

However, the adjustment way described above is extremely inconvenient, the operational process is complex, and it is difficult to adjust and control by the electronic device the projection region for the projection content, and thus the use experience of the user is poor.

SUMMARY

A projection method and an electronic device are provided according to the embodiments of the disclosure, to solve the technical problems that it is difficult to adjust and control by an electronic device a projection region for a projection content.

In one aspect, a projection method is provided according to an embodiment of the disclosure, the projection method is applied to an electronic device including multiple projection units, and the method includes:

projecting a first projection content from a first projection unit;

determining at least one second projection unit of the electronic device in the presence of a first operation; and projecting the first projection content from the at least one second projection unit.

Optionally, the method further includes:

detecting whether there is a second operation in the case that the first operation satisfies a present condition; and determining the second projection unit of the electronic device based on the second operation in the case that the second operation is detected.

Optionally, the method further includes:

detecting a gesture operation for the first projection content by using an image acquisition unit of the electronic device;

detecting a touch-control operation for the first projection content by using a sensing unit of the electronic device; or detecting a voice-control operation for the first projection content by using an audio acquisition unit of the electronic device.

Optionally, the determining the second projection unit of the electronic device based on the second operation includes:

acquiring a position of an end point of the second operation;

determining a projection region corresponding to the end point; and determining the second projection unit which corresponds to the projection region.

Optionally, the method further includes:

judging whether a second projection content is being projected by the second projection unit; and stopping projection of the second projection content from the second projection unit in the case that the second projection content is being projected by the second projection unit.

Optionally, the method further includes:

stopping projection of the first projection content from the first projection unit.

Optionally, the method further includes:

projecting the first and second contents from the second projection unit.

Optionally, in the case that the first projection unit projects the first projection content onto one projection region, the projecting the first projection content from the at least one second projection unit includes:

generating an instruction for splitting a screen in response to the first operation; and projecting the first projection content from the second projection unit onto a plurality of projection regions in response to the instruction for splitting the screen.

Optionally, the projecting the first operation content from the second projection unit onto multiple projection regions in response to the instruction for splitting the screen includes:

acquiring a text part of the first projection content and a picture part of the first projection content;

projecting the text part of the first projection content from the second projection unit onto a plurality of projection regions; and projecting the picture part of the first projection content from the second projection unit onto a plurality of projection regions.

Optionally, in the case that the first projection unit projects the first projection content onto a plurality of projection regions, the projecting the first projection content from the at least one second projection unit includes:

generating an instruction for combining screens in response to the first operation; and projecting the first projection content from the second projection unit onto a single projection region.

Optionally, the controlling the projecting the first projection content from the second projection unit onto the single projection region includes:

acquiring a text part of the first projection content and a picture part of the first projection content; and projecting the text part and the picture part from the second projection unit onto the single projection region.

In another aspect, an electronic device is further provided according to an embodiment of the disclosure, the electronic device includes a processor and multiple projections including a firs projection unit and at least one second projection unit, where the first projection unit is operable to project a first projection content and the processor operable to determine at least one second projection unit of the electronic device in the presence of a preset operation;

determining at least one second projection unit of the electronic device in the presence of the first operation; and projecting the first projection content from the at least one second projection unit.

Optionally, the processor is operable:

to detect whether there is a second operation in the case that the first operation satisfies a present condition; and to determine the second projection unit of the electronic device based on the second operation in the case that the second operation is detected.

Optionally, the processor is operable:

to detect a gesture operation for the first projection content by using an image acquisition unit of the electronic device;

to detect a touch-control operation for the first projection content by using a sensing unit of the electronic device; or to detect a voice-control operation for the first projection content by using an audio acquisition unit of the electronic device.

Optionally, the processor is operable:

to acquire a position of an end point of the second operation;

to determine a projection region corresponding to the end point; and to determine the second projection which corresponds to the projection region.

Optionally, the processor is operable:

to judge whether a second projection content is being projected by the second projection unit; and to stop projection of the second projection content from the second projection unit in the case that the second projection content is being projected by the second projection unit.

Optionally, in the case that the first projection unit projects the first projection content onto one projection region, the processor is operable:

to generate an instruction for splitting a screen in response to the first operation; and to project the first projection content from the second projection unit onto a plurality of projection regions in response to the instruction for splitting a screen.

Optionally, the processor is operable:

to acquire a text part of the first projection content and a picture part of the first projection content;

to project the text part of the first projection content from the second projection unit onto a plurality of projection regions; and to project the picture part of the first projection content from the second projection unit onto a plurality of projection regions.

Optionally, in the case that the first projection unit projects the first projection content onto a plurality of projection regions, the processor is operable:

to generate an instruction for combining screens in response to the first operation; and to project the first projection content from the second projection unit onto a single projection region.

Optionally, the processor is operable:

to acquire a text part of the first projection content and a picture part of the first projection content; and to project the text part and the picture part from the second projection unit onto the single projection region.

BRIEF DESCRIPTION OF THE DRAWINGS

In order to illustrate the technical solutions according to the embodiments of the disclosure, the drawings to be used in the description of the embodiments are described briefly hereinafter. Apparently, the drawings described hereinafter are only some embodiments of the present disclosure, and other drawings may be obtained by those skilled in the art according to those drawings without creative effort.

DETAILED DESCRIPTION

Figure 1:
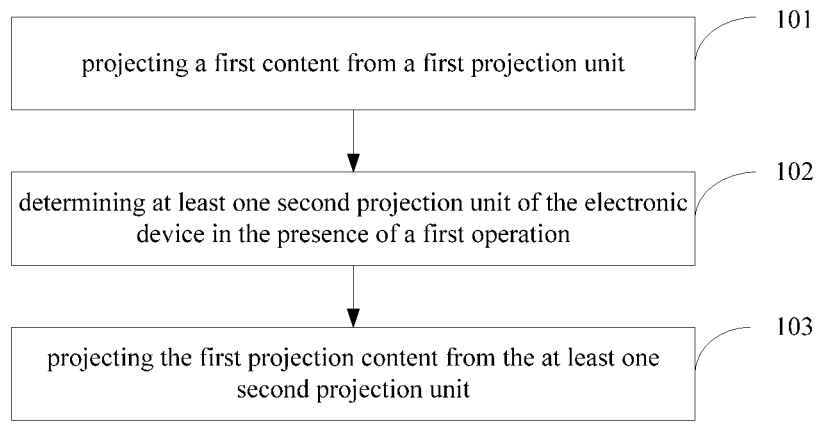
FIG. 1 is a flowchart of a projection method according to an embodiment of the disclosure.

According to the embodiments of the present disclosure, it is provided a projection method, which is applicable to an electronic device including multiple projections units, the method includes steps 101 to 103.

Step 101 includes projecting a first projection content from a first projection unit.

Step 102 includes determining at least one second projection unit of the electronic device in the presence of a first operation.

Step 103 includes projecting the first projection content from the at least one second projection unit.

Another projection method is provided according to an embodiment of the disclosure, the projection method is applicable to an electronic device including at least one projection unit, and the method includes: detecting a first operation for a first projection content of a first projection unit, where the first projection unit is one of the at least one projection unit; judging whether the first operation satisfies a preset condition; detecting whether there is a second operation in a projection region of each of the at least one projection unit, in the case that the first operation satisfies the preset condition; determining a second projection unit corresponding to the second operation in the case that there is the second operation, where the second projection unit is one of the at least one projection unit; and projecting the first projection content by using the second projection unit.

In embodiments of the disclosure, the electronic device may determine that the user desires to adjust the projection region for the projection content in the case that the first operation for the first projection content which satisfies the preset condition is detected, further, the electronic device may determine the second projection unit corresponding to the second operation and control the second projection unit to project the first projection content in the case that the second operation is detected. For this end, the projection region for the first projection content may be adjusted, that is, the projection region may be adjusted by operating the first projection content directly.

For example, the projection region for the first projection content may be dragged from the current region to another region by dragging the first projection content directly. The operational process is simple and quick, and is fitter for the using habits of the user.

Moreover, since the corresponding projection region may be adjusted by operating the first projection content directly, the control by the electronic device to adjust the projection region for the projection content is improved, and a visual convenient adjusting method is provided for the user, thereby improving the use experience of the user.

To make the object, technical solutions and advantages of the disclosure more clear, the technical solutions in the embodiments of the disclosure are described clearly and completely in conjunction with the drawings of the embodiments of the disclosure hereinafter. Apparently, the described embodiments are only a part of the embodiments of the present disclosure. All the other embodiments obtained by those skilled in the art based on the embodiments of the present disclosure without creative effort will fall within the scope of protection of the disclosure. The embodiments of the present disclosure and features in the embodiments may be combined in any manner without conflict. Although a logical order is illustrated in the flowchart, the illustrated or described steps may be performed in an order other than the logical order in some cases.

The term 'and/or' herein is only used to describe an association relationship between associated objects, which represent that there may be three relationships. For example, A and/or B may represent three cases that: only A exists, A and B exist simultaneously, or only B exists. Additionally, generally the character '/' herein represents a 'or' relationship between former and latter associated objects without special specification.

In the embodiments of the present disclosure, the electronic device may be different electronic devices such as a notebook computer, a mobile phone, a PDA (Personal Digital Assistant), a PC (Personal Computer), a projector. The electronic device is which one, which is not defined in the disclosure, as long as the electronic device has a projection function.

For a better understanding of the above technical solutions, the above technical solutions are fully described in conjunction with the drawings and embodiments in the specification hereinafter.

Figure 2:
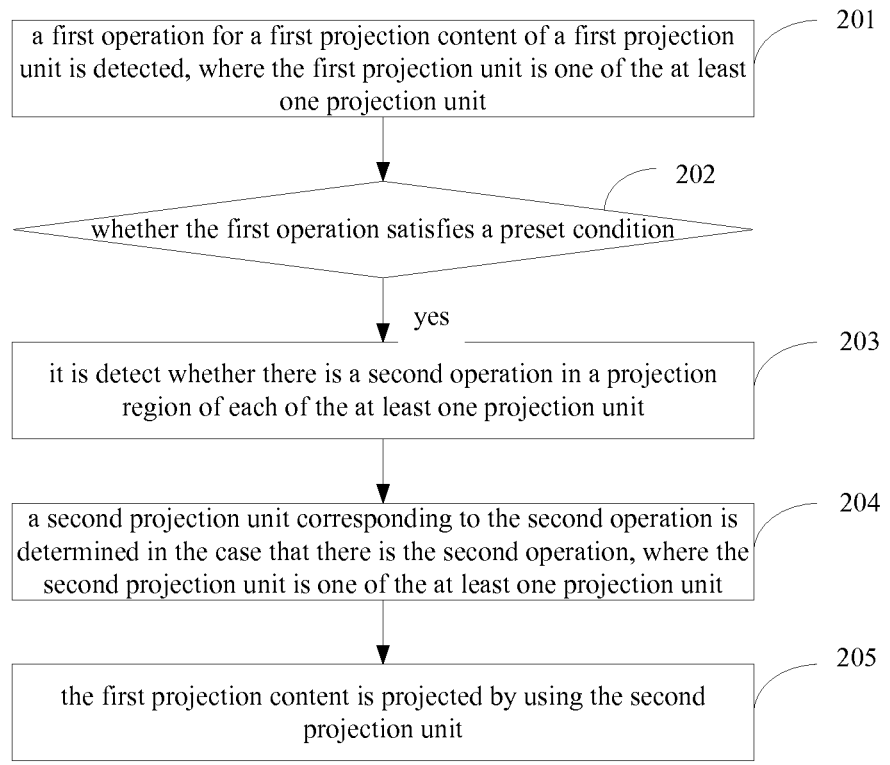
FIG. 2 is a flowchart of another projection method according to an embodiment of the disclosure.

Referring to FIG. 2, another projection method is provided according to an embodiment of the disclosure, the projection method is applicable to an electronic device including at least one projection unit, and the main flowchart of the projection method includes steps 201 to 205.

In step 201, a first operation for a first projection content of a first projection unit is detected, where the first projection unit is one of the at least one projection unit.

In the embodiment of the disclosure, the first operation is an operation performed on the first projection content, and the first projection content is projected by the first projection unit. In the embodiment of the disclosure, the projection region of the first projection unit is adjusted during the projection of the electronic device, that is, the first operation is detected during the projection of the electronic device.

For the convenience of description, the projection region before the first projection content is adjusted is referred to as a first projection region, and the adjusted projection region is referred to as a second projection region in the embodiment of the disclosure.

Optionally, in an embodiment of the disclosure, the process of detecting a first operation for a first projection content of a first projection unit may include:
  detecting a gesture operation for the first projection content by using an image acquisition unit of the electronic device;
  detecting a touch-control operation for the first projection content which is performed on a display unit of the electronic device by using a sensing unit of the electronic device; or detecting a voice-control operation for the first projection content by using an audio acquisition unit of the electronic device.

That is to say, the first projection may be the gesture operation, the touch-control operation or the voice-control operation from the user.

With regard to the gesture operation, for example, there may be two cases as follows.

In a first case, the user may perform a long-press operation directly using a finger on the first projection region on a projection plane corresponding to the first projection content, and long-press operation may be construed as the gesture operation. The projection plane may be a projection curtain, a wall, a tabletop, a floor and the like.

In a second case, the user may make directly a specific gesture in space (not contacting the projection plane), for example, a 'V' gesture, as long as the gesture can be detected by the image detection unit. The specific gesture may also be construed as the gesture operation.

The gesture operation may be an operation performed directly by the user on the projection plane corresponding to the first projection content, or may also be the specific gesture made by the user in space without contacting the projection plane.

The touch-control operation may be a selection click operation performed by the user on the display unit with a touch-control function.

The voice-control operation may be a control voice of 'starting to adjust' spoken directly by the user, and the control voice may be construed as the voice-control operation.

Although the types of the first operation may be different, the effect of the first operation represents that the user is about to start to adjust the first projection region, that is, the first operation may be construed as a triggering condition for adjusting the first projection region. For example, the long-press operation performed on the first projection region on the projection plane corresponding to the first projection content may be construed as a start operation in the whole adjustment process.

In step 202, it is judged whether the first operation satisfies a preset condition.

In the embodiment of the disclosure, it may be judged whether the first operation satisfies the preset condition in the case that the first operation is detected.

For example, in the case that the first operation is a first gesture operation, the preset condition may include long pressing the projection plane for the first projection content for more than 3 seconds. The case that the projection plane corresponding to the first projection content is not long pressed in the gesture operation or the duration of the long press is less than 3 seconds represent that the first gesture operation does not satisfy the preset condition, otherwise, it may be deduced that the first gesture operation does satisfies the preset condition.

Another example, in the case that the first operation is a voice-control operation, the preset condition may include that the control voice of 'starting to adjust' is acquired by the electronic device. In the case that a control voice of 'adjusting' is output by the user, the voice-control operation does not satisfy the preset condition. In the case that the control voice of 'starting to adjust' is output by the user, the voice-control operation satisfies the preset condition.

The gesture operation and the voice-control operation are taken as examples for illustration herein, and the touch-control operation and other possible first operations may also be processed similarly.

In step 203, it is detect whether there is a second operation in a projection region of each of the at least one projection unit, in the case that the first operation satisfies the preset condition.

Once it is determined that the first operation satisfies the preset condition, the electronic device detects whether there is the second operation in projection regions projected by all projection units. The second operation may be an operation performed by the user who performs the first operation.

In specific implementation, the projection region may be a projection region formed on the projection plane, that is, the second operation is an operation performed on the projection region on the actual projection plane. The projection plane may be for example a projection curtain, a wall, a tabletop, a floor and the like.

In the embodiment of the disclosure, the electronic device includes at least one projection unit, that is, the electronic device may include only one projection unit, or may include multiple projection units.

In the case that the electronic device includes only one projection unit, the projection unit may be for example a DLP (Digital Light Procession) projection unit, or may be other projection units with a wide-angle (for example 360 degrees) rotation function. The DLP is a typical projection unit in the mobile phone, by which a video signal is processed digitally and then light is projected out, thereby the projection is achieved. As the typical projection unit in the mobile phone, generally the DLP module is embedded in a side of the mobile phone, and the DLP module is controlled by the mobile phone to be movable upward and downward or rightward and leftward in a small physical space. During the position change of the DLP module, a projection interface projected by the DLP module may change accordingly. For example, the area (namely a display size) of the projection interface may be expanded/reduced accordingly as the DLP module extends outwardly/shrinks inwardly; another example, the display position of the projection interface may move upward/downward/rightward/leftward accordingly as the DLP module moves upward/downward/rightward/leftward.

In the case that the electronic device includes multiple projection units, the multiple projection units may be arranged in different positions in the electronic device. For example, in the case that the electronic device is a mobile phone, the mobile phone may include four projection units which are arranged on four sides on the up/down/right/left of the mobile phone respectively. Moreover, each of the multiple projection units is which one, which is not defined in the disclosure. For example, the projection unit may be the DLP projection unit, or may be an ordinary projection unit, or may be a projection unit with other assisted functions.

The first projection region may be adjusted by changing the projection direction of the projection unit in the embodiment of the disclosure, in the case that the electronic device includes one projection unit; or the first projection region may be adjusted by switching projection units in the embodiment of the disclosure, in the case that the electronic device includes multiple projection units.

In step 204, a second projection unit corresponding to the second operation is determined in the case that there is the second operation, where the second projection unit is one of the at least one projection unit.

Once the second operation is determined, the second projection unit corresponding to the second operation may be determined in a certain way, In the embodiment of the disclosure, the second projection unit and the first projection unit may be the same one, or may be different projection units, which refers to the description of step 203.

Optionally, in an embodiment of the disclosure, the process of determining a second projection unit corresponding to the second operation in the case that there is the second operation may include:

acquiring a position of an end point of the second operation in the case that there is the second operation;

determining a projection region corresponding to the end point; and determining a projection unit which corresponds to the projection region corresponding to the end point, and determining the projection unit to be the second projection unit.

In the embodiment of the disclosure, a method for determining the corresponding second projection unit based on the second operation is described. The end point of the second operation is determined based on the second operation, it is judged that the end point of the second operation is located in a projection region of which projection unit, and the judged projection unit is determined to be the second projection unit.

For example, the second operation is a dragging operation, first it is determined that the end point of the dragging operation is located in a projection region of which projection unit, and the determined projection unit is determined to be the second projection unit, and thus the projection region may be adjusted directly based on the simple dragging operation from the user, thereby meeting the current viewing demand user as far as possible.

In step 205, the first projection content is projected by using the second projection unit.

The projection region for the first projection content may be adjusted by projecting the first projection content by using the second projection unit.

Optionally, in an embodiment of the disclosure, the process of projecting the first projection content by using the second projection unit may include:

judging whether the second projection unit is in an on-state; and projecting the first projection content by using the second projection unit in the case that the second projection unit is in the on-state.

Before the first projection content is projected by using the second projection unit, first it is judged whether the second projection unit is in the on-state, and the second projection unit projects the first projection content in the case that the second projection unit is in the on-state.

Optionally, in an embodiment of the disclosure, after the process of judging whether the second projection unit is in the on-state, the method may further include:

turning on the second projection unit in the case that the second projection unit is not in the on-state; and projecting the first projection content by using the second projection unit.

Before the first projection content is projected by using the second projection unit, first it is judged whether the second projection unit is in the on-state, and the second projection unit is controlled to be turned on in the case that the second projection unit is not in the on-state, so that the second projection unit can project the first projection content.

Optionally, in an embodiment of the disclosure, after the process of determining a second projection unit corresponding to the second operation in the case that there is the second operation, the method may further include:

judging whether a second projection content is being projected by the second projection unit; and controlling the second projection unit to stop projecting the second projection content in the case that the second projection content is being projected by the second projection unit.

Before the second projection unit is controlled to project the first projection content, the second projection unit may project the second projection content. In the case that the second projection unit is required to project the first projection content, first the second projection unit is controlled to stop projecting the second projection content, and then the first projection content is projected by using the second projection unit.

Optionally, in an embodiment of the disclosure, after the process of determining a second projection unit corresponding to the second operation in the case that there is the second operation, the method may further include: controlling the first projection unit to stop projecting the first projection content.

In the case that the first projection content is projected by using the second projection unit, it represents that the projection region for the first projection content is adjusted by the user, and the user may view the first projection content in the adjusted projection region. In this case, the first projection unit may be controlled to stop projecting the first projection content, thereby avoiding interference for the user and reducing power consumption as more as possible. Additionally, the first projection unit may be turned off, thereby further reducing the power consumption.

Optionally, in an embodiment of the disclosure, the process of projecting the first projection content by using the second projection unit may include: projecting the first projection content by using the second projection unit, and projecting the second projection content by using the first projection unit.

In the case that the first projection content is projected by using the second projection unit, the second projection content may be projected by using the first projection unit. In this case, for example, with regard to the polyhedral projection, it may be convenient for multiple users to view different projection contents at the same time, thereby meeting different demands as far as possible.

For a clearer understanding of how to adjust the projection region for the first projection content according to the embodiment of the disclosure by those skilled in the art, a specific implementation is illustrated in conjunction with FIG. 3A, FIG. 3B and FIG. 3C hereinafter. Additionally, the electronic device is the mobile phone with the polyhedral projection function in the following specific description.

Figure 3A:
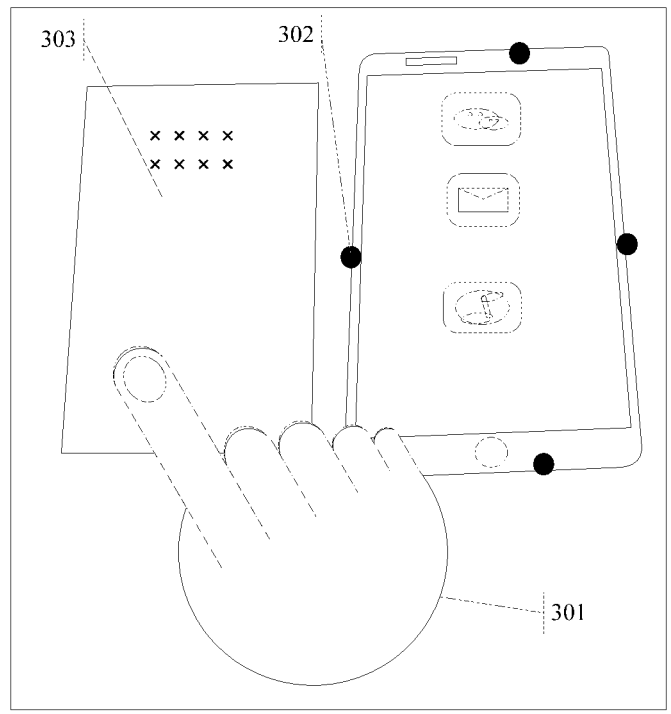
FIG. 3A is a schematic diagram of a first operation according to an embodiment of the disclosure.

Firstly referring to FIG. 3A, the mobile phone has four projection units arranged on four sides on the up/down/right/left of the mobile phone respectively. Assumed that the mobile phone flats on a horizontal desktop, the horizontal desktop may be considered as the projection bearing surface. Currently, a first projection content 303 is being projected by a first projection content 302 on the left of the mobile phone, and a first projection region for the first projection content 303 refers to the desktop region on the left of the mobile phone. During the projection of the first projection content 303 by using the first projection content 302, in the case that the first operation is detected which is performed by a first operator 301 (for example a finger of the user) on the projection region (namely the desktop on the left of the mobile phone) on the projection plane corresponding to the first projection content 303, as shown in FIG. 3A, for example, the first operation is an operation performed by the first operator 301 of pressing the desktop on the left of the mobile phone corresponding to the first projection content 303 for more than three seconds, it may be considered that the first operation satisfies the preset condition, and it represents that the user desires to adjust the projection region for the first projection content 303. Additionally, in the case that the operator presses the desktop on the left of the mobile phone corresponding to the first projection content 303 for more than three seconds, it may represent that the first projection content 303 is selected.

Figure 3B:
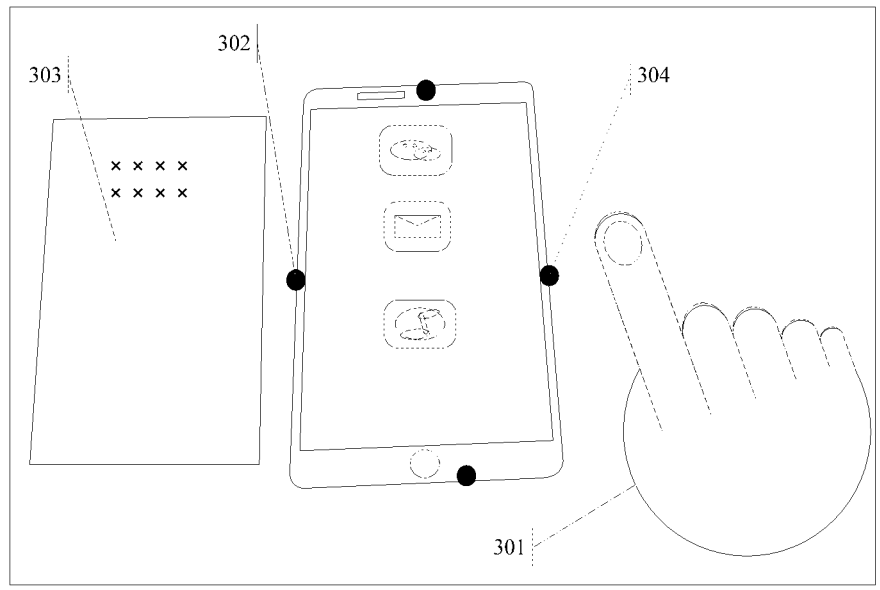
FIG. 3B is a schematic diagram of a second operation according to an embodiment of the disclosure.

Referring to FIG. 3B, the second operation may be performed by the operator 301 at any position in all projectable region of the mobile phone, such as an upper projection region, a right projection region or a lower projection region of the mobile phone, as long as the region can be projected to by the four projection units. The second operation is detected in the right projection region of the mobile phone as shown in FIG. 3B. As shown in FIGS. 3A and 3B, for example, the operator 301 may be perform a dragging operation on the first projection content, that is, the first operation is a starting operation for the dragging operation, and the second operation is a terminating operation for the dragging operation.

Figure 3C:
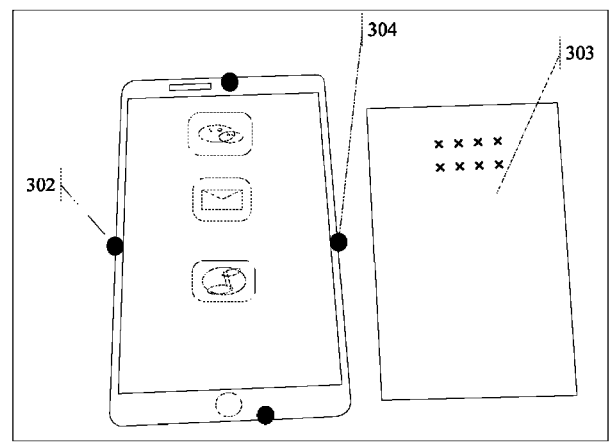
FIG. 3C is a schematic diagram of projecting the first projection content by using the second projection unit according to an embodiment of the disclosure.

After the second operation is detected by the mobile phone in the right projection region, the projection unit corresponding to the right projection region is determined to be a second projection unit 304 based on an end point of the second operation, and the second projection unit 304 is controlled to project the first projection content, referring to FIG. 3C. In this case, the first projection content 303 is projected by the second projection unit 304. Additionally, in the case that the first projection content 303 is dragged by the operator 301, the first projection content 303 may remain unchanged, or may change. The first projection content 303 remaining unchanged is illustrated in FIG. 3C. In FIG. 3C, the first projection unit 302 is turned off once the first projection content 303 is projected by the second projection unit 304, thereby reducing the power consumption of the mobile phone.

The projection region for the first projection content 303 is adjusted by means of the above processes. The above description is only directed against the case that there are multiple projection units, that is, it is described that the adjustment is completed by switching the projection units. With regard to the electronic device including one projection unit, the detection of the first operation and the second operation may be processed in a similar manner, with the difference that the projection region for the first projection content 303 is adjusted by controlling the projection direction of the projection unit.

In the embodiments of the disclosure, the electronic device may determine that the user desires to adjust the projection region for the projection content 303 in the case that the first operation for the first projection content 303 which satisfies the preset condition is detected, further, the electronic device may determine the second projection unit 304 corresponding to the second operation and control the second projection unit 304 to project the first projection content 303 in the case that the second operation is detected. For this end, the projection region for the first projection content 303 may be adjusted, that is, the projection region may be adjusted by operating the first projection content 303 directly.

For example, the projection region for the first projection content 303 may be dragged from the current region to another region by dragging the first projection content 303 directly. The operational process is simple and quick, and is fitter for the using habits of the user.

Moreover, since the corresponding projection region may be adjusted by operating the first projection content 303 directly, the control by the electronic device to adjust the projection region for the projection content is improved, and a visual convenient adjusting method is provided for the user, thereby improving the use experience of the user.

Figure 4:
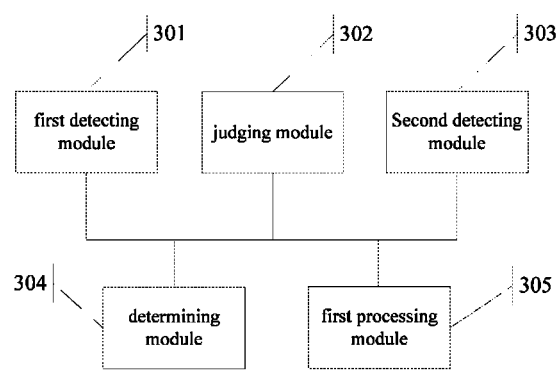
FIG. 4 is a schematic diagram of an electronic device according to an embodiment of the disclosure.

Referring to FIG. 4, an electronic device is further provided according to an embodiment of the disclosure, the electronic device includes at least one projection unit, and the electronic device further includes a first detection module 401, a judgment module 402, a second detection module 403, a determination module 404 and a first processing module 405.

The first detection module 401 is configured to detect a first operation for a first projection content of a first projection unit, where the first projection unit is one of the at least one projection unit.

The judgment module 402 is configured to judge whether the first operation satisfies a preset condition. The second detection module 403 is configured to detect whether there is a second operation in a projection region of each of the at least one projection unit.

The determination module 404 is configured to determine a second projection unit corresponding to the second operation in the case that there is the second operation, where the second projection unit is one of the at least one projection unit.

The first processing module 405 is configured to project the first projection content by using the second projection unit.

Optionally, in an embodiment of the disclosure, the first detection module 401 may be configured to:
  detect a gesture operation for the first projection content by using an image acquisition unit of the electronic device;
  detect a touch-control operation for the first projection content which is performed on a display unit of the electronic device by using a sensing unit of the electronic device; or
  detect a voice-control operation for the first projection content by using an audio acquisition unit of the electronic device.

Optionally, in an embodiment of the disclosure, the determination module 404 may be configured to:
  acquire a position of an end point of the second operation in the case that there is the second operation;
  determine a projection region corresponding to the end point; and
  determine a projection unit which corresponds to the projection region corresponding to the end point, and determine the projection unit to be the second projection unit.

Optionally, in an embodiment of the disclosure, the first processing module 305 may be configured to:
  judge whether the second projection unit is in an on-state; and
  project the first projection content by using the second projection unit in the case that the second projection unit is in the on-state.

Optionally, in an embodiment of the disclosure, the electronic device may further include a second processing module 406 configured to:

turn on the second projection unit in the case that the second projection unit is not in the on-state, after it is judged whether the second projection unit is in the on-state; and project the first projection content by using the second projection unit.

Optionally, in an embodiment of the disclosure, the electronic device may further include a third processing module 407 configured to:

judge whether a second projection content is being projected by the second projection unit, after the second projection unit corresponding to the second operation is determined in the case that there is the second operation; and control the second projection unit to stop projecting the second projection content in the case that the second projection content is being projected by the second projection unit.

Optionally, in an embodiment of the disclosure, the electronic device may further include a control module 408 configured to control the first projection unit to stop projecting the first projection content, after the second projection unit corresponding to the second operation is determined in the case that there is the second operation.

Optionally, in an embodiment of the disclosure, the first processing module 405 may be configured to project the first projection content by using the second projection unit and project the second projection content by using the first projection unit.

In the embodiments of the disclosure, the electronic device may determine that the user desires to adjust the projection region for the projection content in the case that the first operation for the first projection content which satisfies the preset condition is detected, further, the electronic device may determine the second projection unit corresponding to the second operation and control the second projection unit to project the first projection content in the case that the second operation is detected. For this end, the projection region for the first projection content may be adjusted, that is, the projection region may be adjusted by operating the first projection content directly.

For example, the projection region for the first projection content may be dragged from the current region to another region by dragging the first projection content directly. The operational process is simple and quick, and is fitter for the using habits of the user.

Moreover, since the corresponding projection region may be adjusted by operating the first projection content directly, the control by the electronic device to adjust the projection region for the projection content is improved, and a visual convenient adjusting method is provided for the user, thereby improving the use experience of the user.

It should be clearly known by those skilled in the art that, for the convenience and simplicity of description, the functional modules described above are illustrated as an example. In practical application, different functional units may be configured to achieve the above functions as required, that is, the internal structure of the device may be divided into different functional units, to achieve all or part of the functions described above. The specific operational process of the system, device and units described above may refer to the corresponding process in the method embodiments described above, which is not repeated any more herein.

It should be understood that, in the embodiments according to the present application, the disclosed system, device and method may be implemented in other ways. The above-mentioned device embodiments according to the discloser are only illustrative. For example, the division in unit is only a logical division of functions and other kinds of division are possible in practice. For example, multiple units or components may be combined together or may be integrated in another system; or some features may be omitted or not implemented. Furthermore, the coupling, directly coupling or communication connection between the components shown or discussed may be indirectly coupling or communication connection between devices or units via some interfaces and may be electrical, mechanical or in other form.

The units described as separate components may be or may not be physically separated. The component displayed as the display unit may be or may not be a physical unit, i.e. may be located in one place or be distributed to multiple network units. The object of the solution of the embodiments may be achieved as required by some or all of the units.

Furthermore, the functional units in the embodiments of the disclosure may be all integrated in a processing unit; or the functional units may be each operates as a unit; or two or more of the functional units may be integrated in a unit. The integrated unit may be implemented in the form of hardware or in the form of hardware together with software.

The above integrated unit in the disclosure which is implemented in the form of the software function module and which is sold and used as an individual product may also be stored in computer readable storage medium of a computer. On the basis of this understanding, the technical principle of the disclosure or the part of the disclosure contributing to the existing technologies may be embodied in a form of a software product which is stored in a storage medium and which include multiple instructions for instructing a computer device (which may be a personal computer, a server, a network equipment or the like) or a processor to perform all or part of the methods described in the embodiments of the disclosure. The storage medium may include any medium which can store program code, such as a USB flash disk, a removable hard disk, a read-only memory (ROM), a random access memory (RAM), a magnetic disk or an optical disk.

Specifically, computer program instructions corresponding to a projection method according to the embodiment of the disclosure may be stored in the storage medium such as an optical disk, a hard disk or a USB flash disk. The computer program instructions corresponding to an information processing method stored in the storage medium, when being read or executed by an electronic device, may include:

detecting a first operation for a first projection content of a first projection unit, where the first projection unit is one of the at least one projection unit;

judging whether the first operation satisfies a preset condition;

detecting whether there is a second operation in a projection region of each of the at least one projection unit, in the case that the first operation satisfies the preset condition;

determining a second projection unit corresponding to the second operation in the case that there is the second operation, where the second projection unit is one of the at least one projection unit; and projecting the first projection content by using the second projection unit.

Optionally, a computer instruction stored in the storage medium corresponding to the step of detecting a first operation for a first projection content of a first projection unit, when executed, may include: detecting a gesture operation for the first projection content by using an image acquisition unit of the electronic device; detecting a touch-control operation for the first projection content which is performed on a display unit of the electronic device by using a sensing unit of the electronic device; or detecting a voice-control operation for the first projection content by using an audio acquisition unit of the electronic device.

Optionally, a computer instruction stored in the storage medium corresponding to the step of determining a second projection unit corresponding to the second operation in the case that there is the second operation, when executed, may include: acquiring a position of an end point of the second operation in the case that there is the second operation; determining a projection region corresponding to the end point; and determining a projection unit which corresponds to the projection region corresponding to the end point, and determining the projection unit to be the second projection unit.

Optionally, a computer instruction stored in the storage medium corresponding to the step of projecting the first projection content by using the second projection unit, when executed, may include: judging whether the second projection unit is in an on-state; and projecting the first projection content by using the second projection unit in the case that the second projection unit is in the on-state.

Optionally, the computer program instructions may further include, after a computer instruction stored in the storage medium corresponding to the step of judging whether the second projection unit is in the on-state is executed: turning on the second projection unit in the case that the second projection unit is not in the on-state; and projecting the first projection content by using the second projection unit.

Optionally, the computer program instructions may further include, after a computer instruction stored in the storage medium corresponding to the step of determining a second projection unit corresponding to the second operation in the case that there is the second operation is executed: judging whether a second projection content is being projected by the second projection unit; and controlling the second projection unit to stop projecting the second projection content in the case that the second projection content is being projected by the second projection unit.

Optionally, the computer program instructions may further include, after a computer instruction stored in the storage medium corresponding to the step of determining a second projection unit corresponding to the second operation in the case that there is the second operation is executed: controlling the first projection unit to stop projecting the first projection content.

Another projection method is provided according to the embodiments of the disclosure, to solve the technical problem that an operation for combining screens or an operation for splitting a screen performed by a user may not be responded by the electronic device.

In order to solve the above technical problem, the technical solutions as follows are provided according to the embodiments of the disclosure. A projection method is provided, which is applicable to an electronic device, where the electronic device are provided with N projection units and the N projection units are capable of projecting M projection contents in M projection regions, where N is an integer greater than or equal to 2 and M is an integer ranges from 1 to N, and the projection method includes: detecting a first operation of a user in the M projection regions; and generating an instruction for splitting a screen or an instruction for combining screens in response to the first operation, where the instruction for splitting a screen is used to control the electronic device to project and output a first projection content in a first projection region onto P projection regions, the first projection region is included in the M projection regions and the first projection region is determined based on the first operation, where P is an integer less than or equal to M; the instruction for combining screens is used to control the electronic device to combine K projection contents in the M projection regions and project and output the combined projection content onto a second projection region, the second projection region is included in the M projection regions and the second projection region is determined based on the first operation, where K is an integer ranges from 2 to M.

In the technical solutions according to the embodiments of the disclosure, a gesture operation performed by a user on the projection unit is detected and acquired, and the electronic device adjusts the projection unit to combine projection contents or split a projection content in response to the gesture operation of the user. Compared with the problem that the projection unit may not be operated by a gesture, according to the technical solutions of the embodiments of the disclosure, the problem that an operation for combining screens or an operation for splitting a screen performed by the user may not be responded by the electronic device can be solved effectively, and therefore the electronic device can respond to an operation for combining screens or an operation for splitting a screen performed by the user.

For a better understanding of the above technical solutions, the technical solutions in the embodiments of the disclosure are described in details in conjunction with the drawings and the embodiments of the disclosure hereinafter.

Before the projection method according to the embodiment of the disclosure is described in details, the electronic device corresponding to the method is introduced briefly. The electronic device according to the embodiment of the disclosure may be a mobile phone, or may be a tablet computer. Certainly, the electronic device is not limited to the two kinds of electronic devices. N projection units are provided in the electronic device, the number of the projection units is not defined, and there may be two, three, or may be four or more projection units.

To make the technical solutions in the embodiments of the disclosure to be understood clearly and completely by those skilled in the art, the electronic device is a mobile phone and four projection units are provided in the electronic device, which is taken as an example in the following description. Specifically, referring to FIG. 5 which is a schematic structural diagram of an electronic device, two of the four projection units are arranged respectively on two sides of the left and right of the mobile phone and the other projection units are arranged on the upper end of the mobile phone. In the following, the specific implementation process of the method according to the embodiment of the disclosure is illustrated in conjunction with a specific example.

Figure 6:
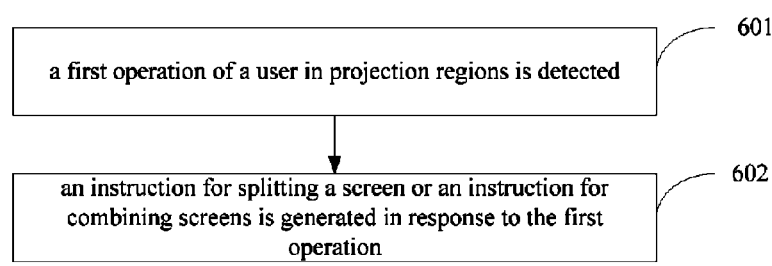
FIG. 6 is a flowchart of another projection method according to an embodiment of the disclosure.

Referring to FIG. 6, the specific implementation process of a projection method is provided according to the first embodiment of the disclosure. The method includes steps 601 to 602.

In step 601, a first operation of a user in projection regions is detected.

In step 602, an instruction for splitting a screen or an instruction for combining screens is generated in response to the first operation.

The instruction for splitting a screen is used to control the electronic device to project and output a first projection content in a first projection region onto P projection regions, the first projection region is included in the M projection regions and the first projection region is determined based on the first operation, where P is an integer less than or equal to M.

The instruction for combining screens is used to control the electronic device to combine K projection contents in the M projection regions and project and output the combined projection content onto a second projection region, the second projection region is included in the M projection regions and the second projection region is determined based on the first operation, where K is an integer ranges from 2 to M.

The mobile phone may determine the type of the first operation, in which the first operation may be an instruction for splitting a screen or an instruction for combining screens.

In the case where the first operation is an instruction for splitting a screen, the type of the instruction for splitting a screen is determined; or in the case that the first operation is an instruction for combining screens, the type of the instruction for combining screens is determined.

Figure 7:
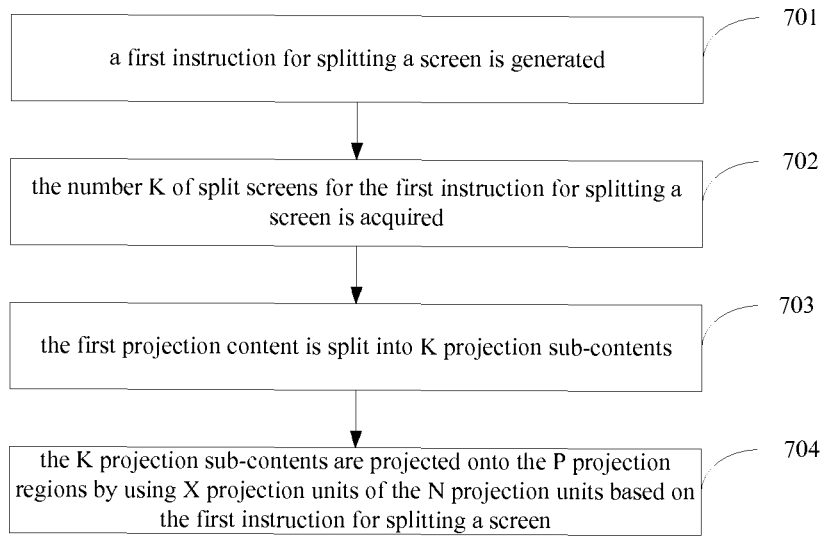
FIG. 7 is a flowchart of implementing a first instruction for splitting a screen in a projection method according to an embodiment of the disclosure.

Referring to FIG. 7, the specific implementation process of step 602 includes steps 701 to 704.

In step 701, a first instruction for splitting a screen is generated.

In step 702, the number K of split screens for the first instruction for splitting a screen is acquired, where K is an integer greater than or equal to 2.

In step 703, the first projection content is split into K projection sub-contents.

In step 704, the K projection sub-contents are projected onto the P projection regions by using X projection units of the N projection units based on the first instruction for splitting a screen, where X is an integer ranges from 2 to N, and the P projection regions are included in the M projection regions.

Figure 8:
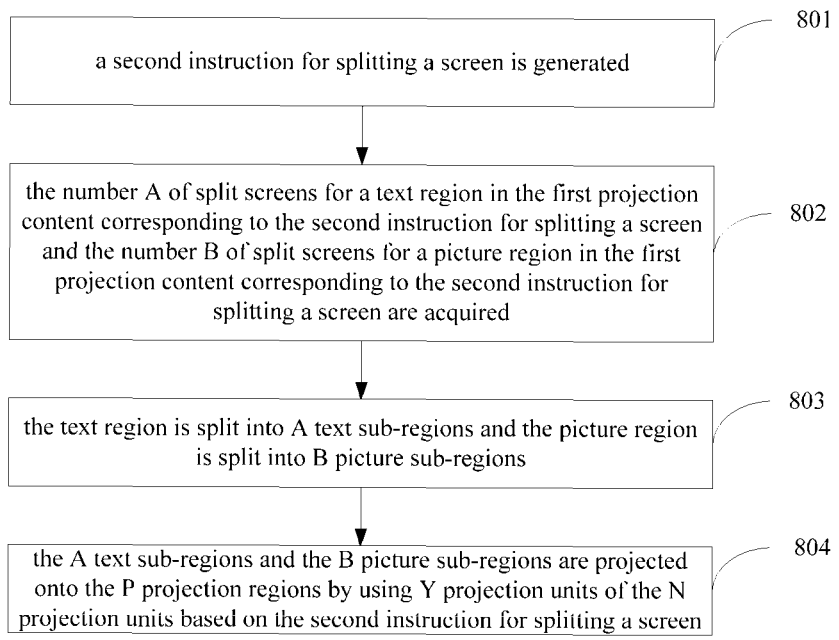
FIG. 8 is a flowchart of implementing a second instruction for splitting a screen in a projection method according to an embodiment of the disclosure.

Referring to FIG. 8, the specific implementation process of step 602 includes steps 801 to 804.

In step 801, a second instruction for splitting a screen is generated.

In step 802, the number A of split screens for a text region in the first projection content corresponding to the second instruction for splitting a screen and the number B of split screens for a picture region in the first projection content corresponding to the second instruction for splitting a screen are acquired, where A and B are integers greater than or equal to 1.

In step 803, the text region is split into A text sub-regions and the picture region is split into B picture sub-regions.

In step 804, the A text sub-regions and the B picture sub-regions are projected onto the P projection regions by using Y projection units of the N projection units based on the second instruction for splitting a screen, where Y is an integer ranges from 2 to N, and the P projection regions are included in the M projection regions.

Figure 9:
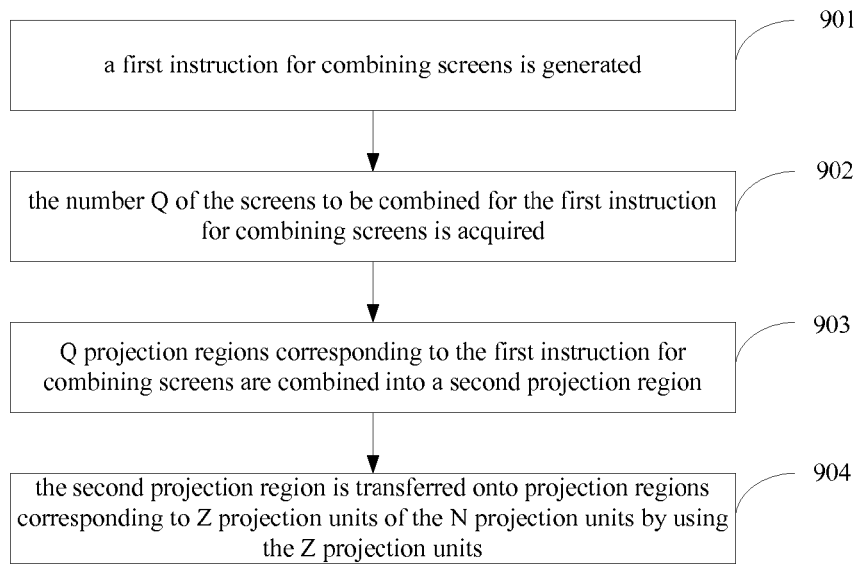
FIG. 9 is a flowchart of implementing a first instruction for combining screens in a projection method according to an embodiment of the disclosure.

Referring to FIG. 9, the specific implementation process of step 602 includes steps S401 to S404.

In step 901, a first instruction for combining screens is generated.

In step 902, the number Q of the screens to be combined for the first instruction for combining screens is acquired, where Q is an integer greater than or equal to 2.

In step 903, Q projection regions corresponding to the first instruction for combining screens are combined into a second projection region, where the second projection region is included in the M projection regions.

In step 904, the second projection region is transferred onto projection regions corresponding to Z projection units of the N projection units by using the Z projection units, where Z is an integer ranges from 1 to N.

Figure 10:
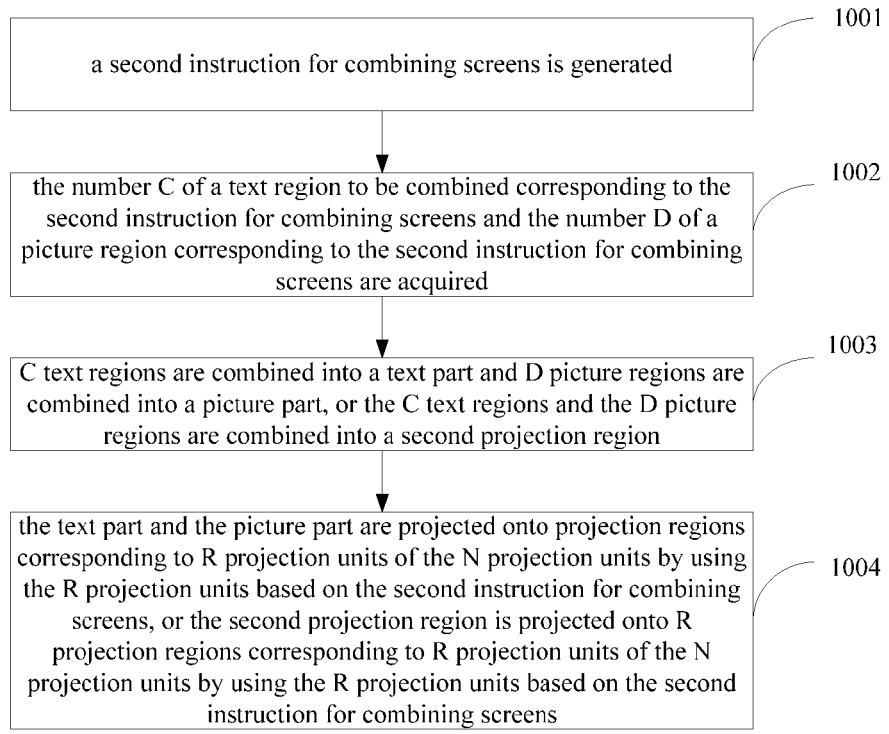
FIG. 10 is a flowchart of implementing a second instruction for combining screens in a projection method according to an embodiment of the disclosure.

Referring to FIG. 10, the specific implementation process of step 602 includes steps 1001 to 1004.

In step 1001, a second instruction for combining screens is generated.

In step 1002, the number C of a text region to be combined corresponding to the second instruction for combining screens and the number D of a picture region corresponding to the second instruction for combining screens are acquired, where C and D are integers greater than or equal to zero and are not equal to zero at the same time.

In step 1003, C text regions are combined into a text part and D picture regions are combined into a picture part, where the text part and the picture part are included in the M projection regions, the text part includes one or more of the M projection regions and the picture part includes one or more of the M projection regions; or the C text regions and the D picture regions are combined into a second projection region, where the projection region is included in the M projection regions.

In step 1004, the text part and the picture part are projected onto projection regions corresponding to R projection units of the N projection units by using the R projection units based on the second instruction for combining screens, where R is an integer ranges from 2 to N; or the second projection region is projected onto R projection regions corresponding to R projection units of the N projection units by using the R projection units based on the second instruction for combining screens, where R is an integer ranges from 1 to N.

Figure 11:
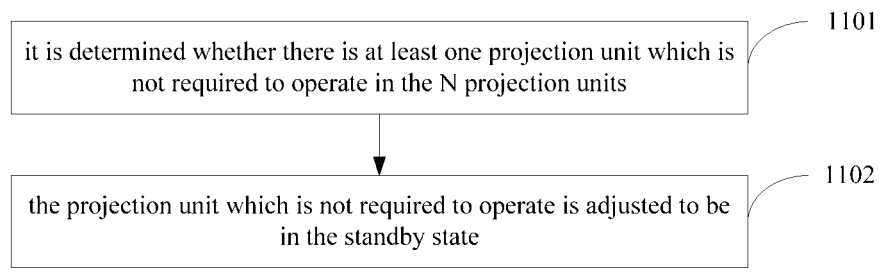
FIG. 11 is a flowchart of a specific implementation after the projection method illustrated in FIG. 6.

Referring to FIG. 11, the method further includes step 1101 to 1102, after step 602 is completed.

In step 1101, it is determined whether there is at least one projection unit which is not required to operate in the N projection units.

In step 1102, the projection unit which is not required to operate is adjusted to be in the standby state.

In the following, the specific implementation process of the projection method according to the embodiment of the disclosure is described in conjunction with a specific example.

Figure 5:
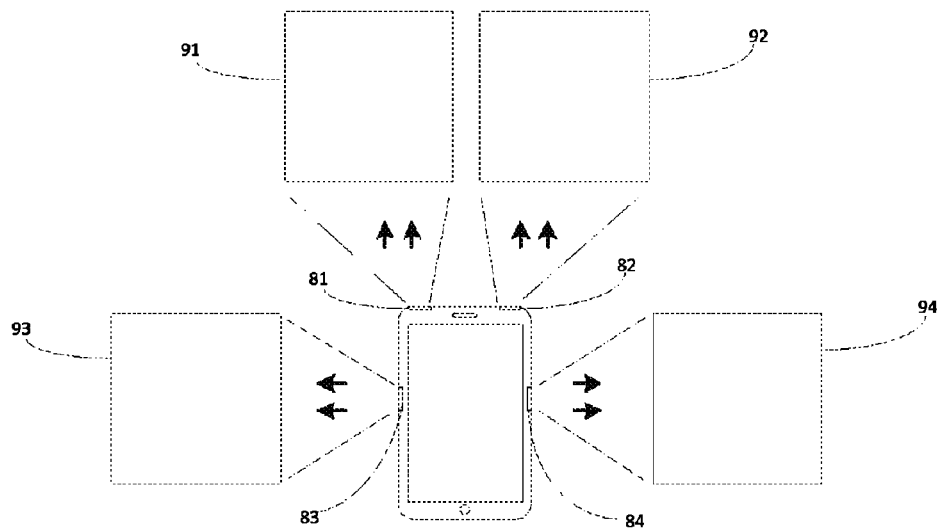
FIG. 5 is a schematic diagram of an electronic device according to an embodiment of the disclosure.

Four projection units are provided in a mobile phone and there are various operating modes for each of the projection units. Assumed that the projection units as shown in FIG. 5 are numbered as follows: No.1 projection unit 81 on the upper-left of the mobile phone, No. 2 projection unit 82 on the upper-right of the mobile phone, No.3 projection unit 83 on the left of the mobile phone, and No.4 projection unit 84 on the right of the mobile phone. The projection regions corresponding to the projection units include No.1 projection region 91, No.2 projection region 92, No.3 projection region 93 and No.4 projection region 94 respectively.

Figure 12A:
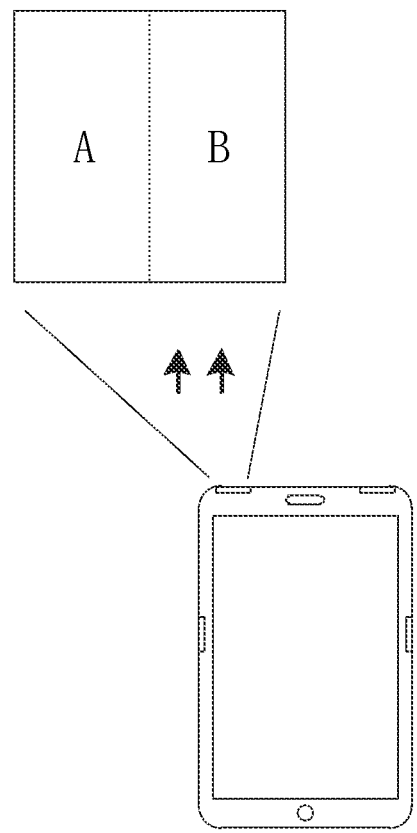
FIG. 12A-12D are schematic diagrams of a specific implementation of responding by the electronic device the first instruction for splitting a screen according to an embodiment of the disclosure.

Assumed that the operating mode of the four projection units of the mobile phone is as shown in FIG. 12A. Specifically, only the No.1 projection unit 81 is in an operating state, that is, the No.1 projection unit 81 projects a projection content onto the corresponding projection region, and the projection content includes two pictures of picture A and picture B.

Figure 12B:
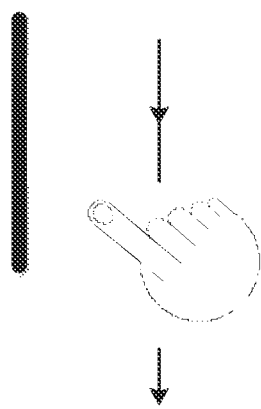

In this case, the user makes a gesture operation if the user desires to separate the picture A and the picture B. Assumed that the gesture operation is like '1', namely a vertical line, referring to FIG. 12B which is a schematic diagram of a gesture operation, step S101 is performed by the mobile phone, in which a first operation of the user is detected in the M projection regions. Specifically, an operation of the user which is an operation for splitting a screen shaped like '1' is detected by the mobile phone in the No.1 projection region 91.

After step 601 is completed, step 602 is performed, in which an instruction for splitting a screen or an instruction for combining screen is generated in response to the first operation. For example, step 601 is performed by the mobile phone, in which the first instruction for splitting a screen is generated. Continuing to illustrate the above example, the instruction may be generated by a processor equipped inside the mobile phone.

After step 701 is completed, step 702 is performed, in which the number K of split screens for the first instruction for splitting a screen is acquired, where K is an integer greater than or equal to 2. Continuing to illustrate the above example, since the gesture of the user is like '1' and the No.1 projection region is split into the left and right parts due to the first operation of the user, the mobile phone acquires the number 2 of split screens for the gesture.

Figure 12C:
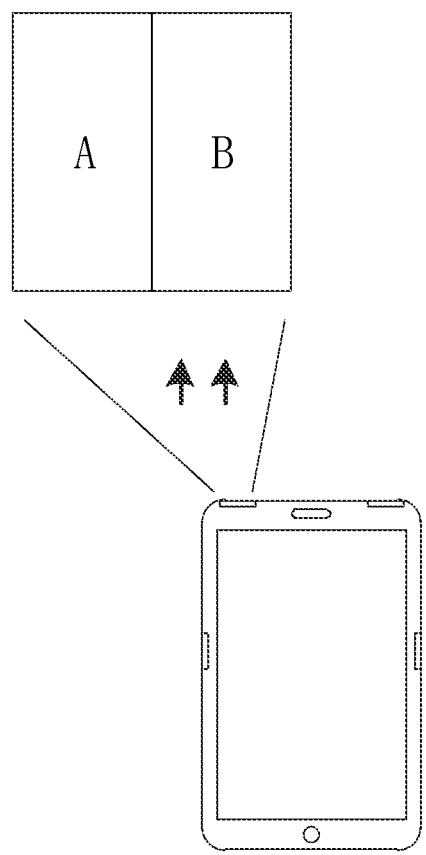

After step 702 is completed, step 703 is performed, in which the first projection content is split into K projection sub-contents. Continuing to illustrate the above example, referring to FIG. 12C, the projection content is split by the mobile phone into two projection sub-contents on the left and right sides, in which the picture A is included in the projection sub-content on the left side and the picture B is included in the projection sub-content on the right side.

Figure 12D:
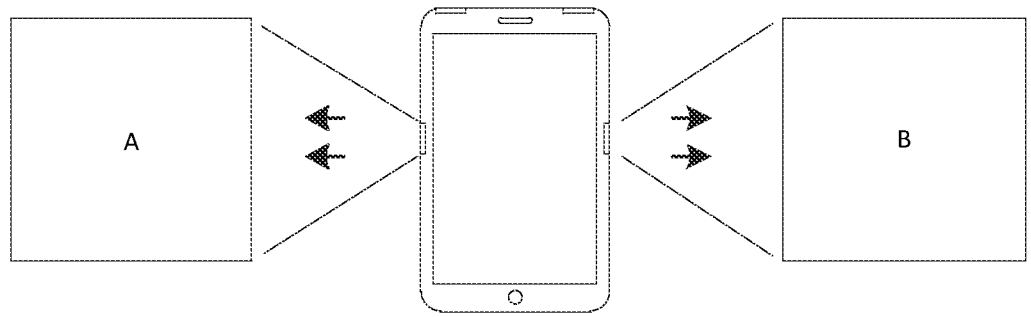

After step 703 is completed, step 704 is performed, in which the K projection sub-contents are projected onto the P projection regions by using X projection units of the N projection units based on the first instruction for splitting a screen, where X is an integer ranges from 2 to N, and the P projection regions are included in the M projection regions. Continuing to illustrate the above example, referring to FIG. 12D, the mobile phone projects the two projection sub-contents onto two projection regions by using two of the four projection units. Specifically, the mobile phone projects the projection sub-content including the picture A onto the No.3 projection region 93 corresponding to the No.3 projection unit 83 by using the No.3 projection unit 83 at the left side, and the mobile phone projects the projection sub-content including the picture B onto the No.4 projection region 94 corresponding to the No.4 projection unit 84 by using the No.4 projection unit 84 at the right side.

The projection unit may be assigned automatically by an algorithm preset in the mobile phone when the mobile phone selects a projection unit for projection, or the projection unit may be adjusted by the user according to the needs of the user. For example, a projection sub-content including the picture A may be projected onto the No.4 projection region 94 by using the No.4 projection unit 84, and a projection sub-content including the picture B may be projected onto the No.3 projection region 93 by using the No.3 projection unit 83, according to the needs of the user. Moreover, the size of each split projection sub-content may be determined by a preset algorithm, or may be adjusted automatically based on the size of the projection region, or the size of the original projection sub-region may not be changed. For example, in the case that the projection sub-content including the picture A is projected, the size of the picture A may be adjusted based on the area of the projection region, so that the size of the picture A is the same as that of the projection region, alternatively, the size of the picture A may not be adjusted and the area of the picture A remains unchanged, for which the specific way is not described any more herein.

After step 704 is completed, step 1101 is performed, in which it is determined whether there is at least one projection unit which is not required to operate in the N projection units. Continuing to illustrate the above example, the No.3 projection unit and the No.4 projection unit on the left and right side of the mobile phone operate and the No.1 projection unit 81 is not required to operate. In this case, the mobile phone detects that it is not necessary for the No.1 projection unit 81 to operate and the No.1 projection unit 81 may be in the standby state.

After step 1101 is completed, step 1102 is performed, in which the projection unit is adjusted to be in the standby state. Continuing to illustrate the above example, the mobile phone adjusts the No.1 projection unit 81 from an operating state into the standby state.

The gesture operation in the embodiment is not limited. Assumed that the mobile phone, when performing step 601, acquires a first operation shaped like '+', namely a horizontal line plus a vertical line, step 701 is performed by the mobile phone to generate an instruction corresponding to this operation. Sequentially, step 702 is performed by the mobile phone to acquire the number 4 of split screens in response to the instruction. Step 703 is performed by the mobile phone to split the projection content projected by the No.1 projection unit 81 into four projection sub-contents of No.1 sub-content, No.2 projection sub-content, No.3 projection sub-content and No.4 projection sub-content. Step 704 is performed to project the four projection sub-contents onto the No.1 projection region to the No.4 projection region corresponding to the four projection units by using the No.1 projection unit to the No.4 projection unit of the mobile phone, for which the specific implementation is not described any more herein. Besides the two example described above, there is other instruction for splitting a screen, which is not listed in details herein.

Besides the process of splitting the original projection content into projection sub-contents, the mobile phone may further respond to a second instruction for splitting a screen. In the following, the specific implementation of the projection method of the disclosure is illustrated in conjunction with a specific example.

Figure 13A:
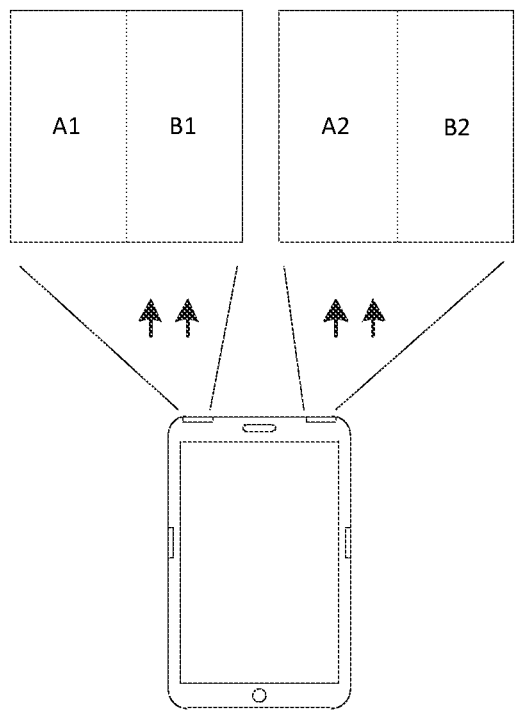
FIG. 13A-13D are schematic diagrams of a specific implementation of responding by the electronic device the second instruction for splitting a screen according to an embodiment of the disclosure.
Figure 13B:
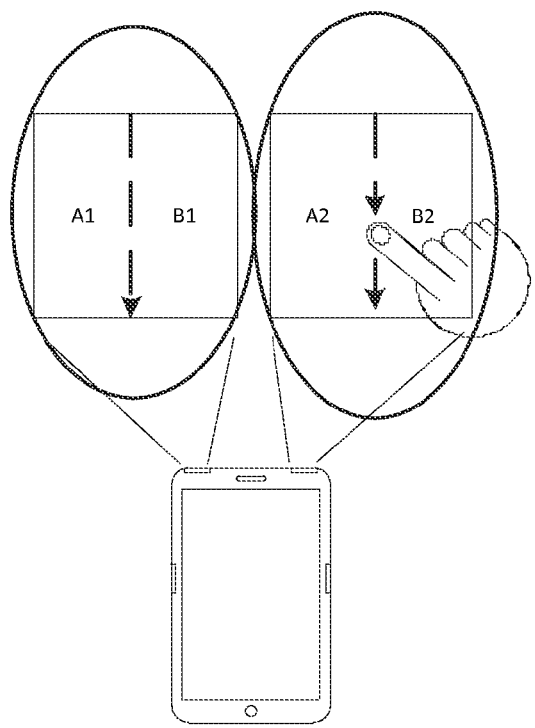

Referring to FIG. 13A, assumed that the No.1 projection unit 81 and the No. 2 projection unit 82 of the mobile phone are in the operating state, the rejection region 91 corresponding to the No.1 projection unit includes text parts A1 and A2, and the rejection region 92 corresponding to No.2 projection unit includes picture parts B1 and B2. In this case, if the user desires to split the original projection content, step 601 is performed by the mobile phone, in which a first operation of the user is detected in the M projection regions. Continuing to illustrate the above example, referring to FIG. 13B, the first operation is detected by the mobile phone in the projection region 91 and the projection region 92, in which the text parts and the picture parts are selected respectively with circles, and then the text parts are split into specific text sub-parts and the picture parts are split into specific picture sub-parts.

After step 601 is completed, step 602 is performed, in which an instruction for splitting a screen or an instruction for combining screens is generated in response to the first operation. For example, step 801 is performed by the mobile phone, in which the second instruction for splitting a screen is generated. Continuing to illustrate the above example, the instruction may be generated by a processor equipped inside the mobile phone.

After step 801 is completed, step 802 is performed, in which the number A of split screens for a text region in the first projection content corresponding to the second instruction for splitting a screen and the number B of split screens for a picture region in the first projection content corresponding to the second instruction for splitting a screen are acquired, where A and B are integers greater than or equal to 1. Continuing to illustrate the above example, since the text region and the picture region are selected respectively with circles in response to the above instruction, the mobile phone acquires the number 2 of the split screens for the text region and the number 2 of the split screens for the picture region in the first projection content.

Figure 13C:
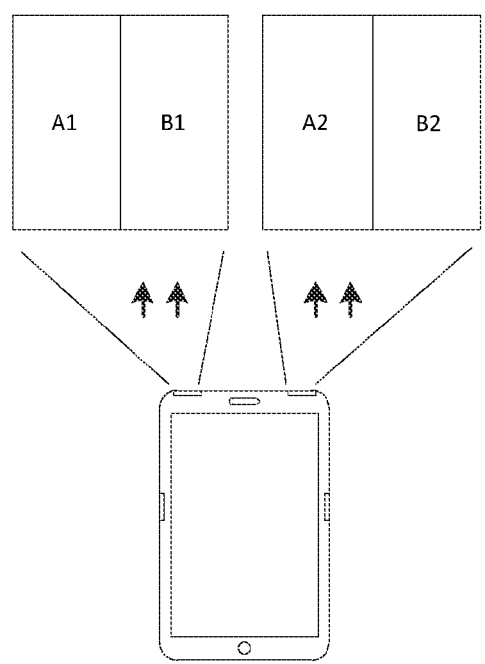

After step 802 is completed, step 803 is performed, in which the text region is split into A text sub-regions and the picture region is split into B picture sub-regions. Continuing to illustrate the above example, referring to FIG. 13C, the text region is split by the mobile phone into two text sub-regions and the picture region is split by the mobile phone into two picture sub-regions.

Figure 13D:
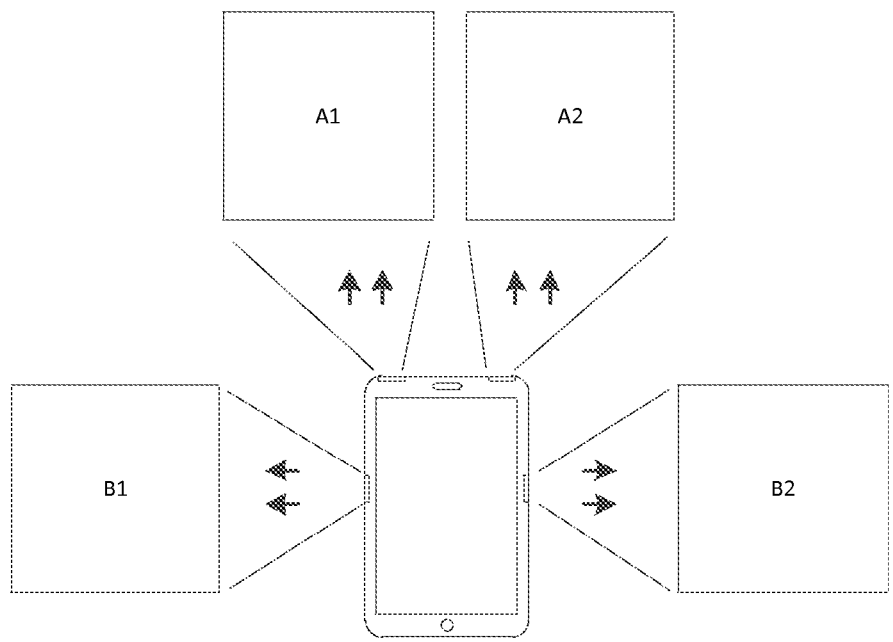

After step 803 is completed, step 804 is performed, in which the A text sub-regions and the B picture sub-regions are projected onto the P projection regions by using Y projection units of the N projection units based on the second instruction for splitting a screen, where Y is an integer ranges from 2 to N, and the P projection regions are included in the M projection regions. Continuing to illustrate the above example, the mobile phone projects the two text sub-regions and the two picture sub-regions onto four projection regions by using four projection units. Specifically, referring to FIG. 13D, the mobile phone projects a text sub-region including A1 onto the No.1 projection region 91 by using the No.1 projection unit 81, projects a text sub-region including A2 onto the No.2 projection region 92 by using the No.2 projection unit 82, projects a picture sub-region including B1 onto the No.3 projection region 93 by using the No.3 projection unit 83, and projects a picture sub-region including B2 onto the No.4 projection region 94 by using the No.4 projection unit 84.

The way of projection is not unique, and the projection unit may be assigned automatically by an algorithm preset in the mobile phone, or the projection unit may be adjusted by the user according to the needs of the user. For example, the picture sub-region including B1 may be projected onto the No.1 projection region 91 by using the No.1 projection unit 81, the picture sub-region including B2 may be projected onto the No.2 projection region 92 by using the No.2 projection unit 82, the text sub-region including A1 may be projected onto the No.3 projection region 93 by using the No.3 projection unit 83, and the text sub-region including A2 may be projected onto the No.4 projection region 94 by using the No.4 projection unit 84. Moreover, the size of each split projection sub-content may be determined by a preset algorithm, or may be adjusted automatically based on the size of the projection region, or the size of the original projection sub-region may not be changed. For example, the mobile phone may project the above two text sub-regions and two picture sub-regions onto the No.3 projection region 93 corresponding to the No.3 projection unit 83 and the No.4 projection region 94 corresponding to the No.4 projection unit 84 by using the No.3 projection unit 83 and the No.4 projection unit 84 respectively, in which the two text sub-regions are included in the No.3 projection region 93 and the two picture sub-regions are included in the No.4 projection region 94, or the two picture sub-regions are included in the No.3 projection region 93 and the two text sub-regions are included in the No.4 projection region 94, for which the specific implementation is not described any more herein.

Besides the operation for splitting a screen performed by the user, the mobile phone may further respond to an operation for combining screens performed by the user. In the following, the specific implementation of the operation for combining screens according to an embodiment of the disclosure is illustrated in conjunction with a specific example.

Figure 14A:
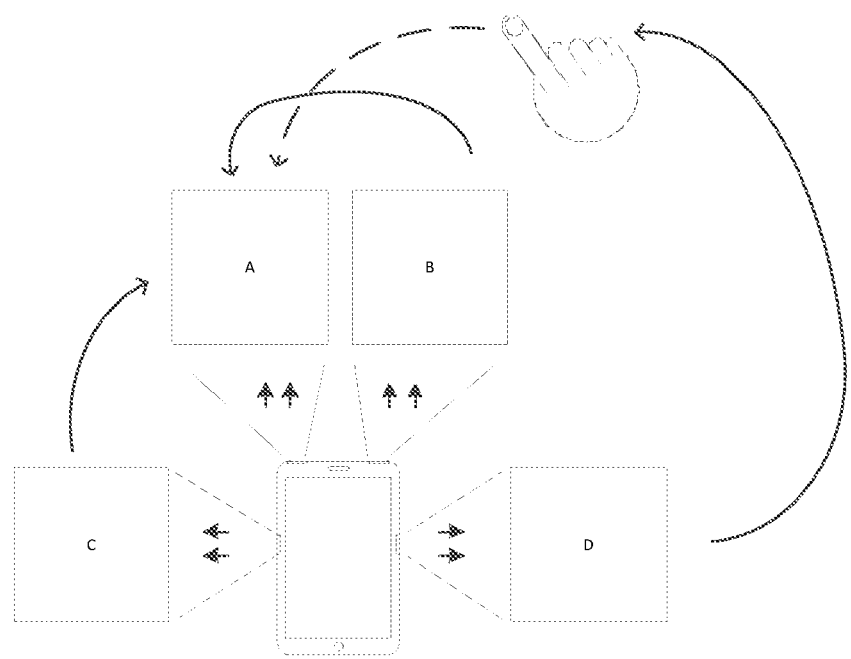
FIG. 14A-14B are schematic diagrams of a specific implementation of responding by the electronic device the first instruction for combining screens according to an embodiment of the disclosure.

Assumed that the operating mode of four projection units of the mobile phone is as follows, referring to FIG. 14A, No.1 projection unit to No.4 projection unit operate, in which the No.1 projection unit 81 projects a projection content including A onto No.1 projection region 91, the No.2 projection unit 82 projects a projection content including B onto No.2 projection region 92, the No.3 projection unit 83 projects a projection content including C onto No.3 projection region 93, and the No.4 projection unit 84 projects a projection content including D onto No.4 projection region 94.

In this case, if the user desires to perform an operation for combining screens, step 601 is performed by the mobile phone, in which a first operation of the user is detected in the M projection regions. Continuing to illustrate the above example, referring to FIG. 14A, the first operation of the user is detected by the mobile phone, in which the finger of the user moves from the No.3 projection region 93 to the No.1 projection region 91, moves from the No.2 projection region 92 to the No.1 projection region 91 and then moves from the No.4 projection region 94 to the No.1 projection region 91.

After step 601 is completed, step 602 is performed, in which an instruction for splitting a screen or an instruction for combining screens is generated in response to the first operation. For example, step 901 is performed by the mobile phone, in which the instruction for combining screens is generated. Continuing to illustrate the above example, the instruction may be generated by a processor equipped inside the mobile phone.

After step 901 is completed, step 902 is performed, in which the number Q of screens to be combined for the first instruction for combining screens is acquired, where Q is an integer greater than or equal to 2. Continuing to illustrate the above example, since the contents in the No.3 projection region 93, the No.2 projection region 92 and the No.4 projection region 94 are combined into the No.1 projection region 91 in the above operation, the mobile phone acquires the number 4 of the screens to be combined for the first instruction for combining screens.

After step 902 is completed, step 903 is performed, in which Q projection regions corresponding to the first instruction for combining screens are combined into a second projection region, where the second projection region is included in the M projection regions. Continuing to illustrate the above example, the mobile phone combines the contents in the No.3 projection region 93, the No.2 projection region 92, the No.4 projection region 94 and the No.1 projection region 91 together and combines the four projection regions into a second projection region.

Figure 14B:
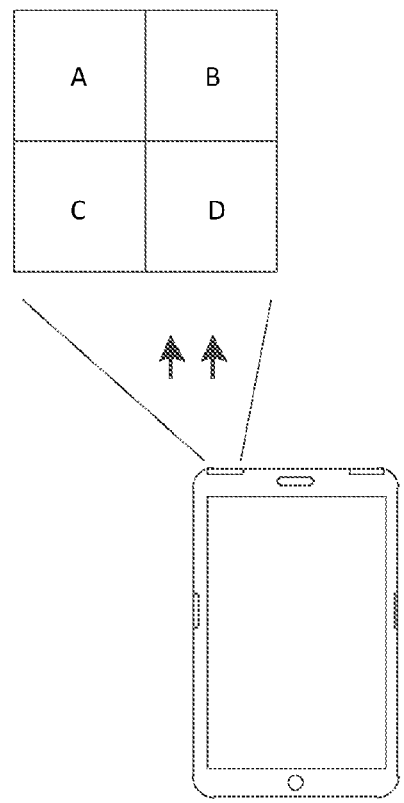

After step 903 is completed, step 904 is performed, in which the second projection region is transferred onto projection regions corresponding to Z projection units of the N projection units by using the Z projection units based on the first instruction for combining screens, where Z is an integer ranges from 1 to N. Continuing to illustrate the above example, the mobile phone projects a projection content including the contents in the four projection regions onto a projection region by using one of the four projection units. Referring to FIG. 14B, the mobile phone projects the second projection region including the content in the four projection regions onto the No.1 projection region 91 corresponding to the No.1 projection unit 81 by using the No.1 projection unit 81.

The way of projection is not unique, and the projection unit may be assigned automatically by an algorithm preset in the mobile phone, or the projection unit may be adjusted by the user according to the needs of the user. For example, the mobile phone may project the second projection region including the contents in the four projection regions onto the No.2 projection region 92 corresponding to the No.2 projection unit 82 by using the No.2 projection unit 82 according to the needs of the user. Moreover, the size of each split projection sub-content may be determined by a preset algorithm, or may be adjusted automatically based on the size of the projection region, or the size of the original projection sub-region may not be changed. For example, the size of each split projection sub-region may be adjusted based on the new projection region, or may be adjusted adaptively by a preset algorithm based on the number of screens to be combined, for which the specific implementation is not described any more herein.

After step 904 is completed, step 1101 is performed, in which it is determined whether there is at least one projection unit which is not required to operate in the N projection units. Continuing to illustrate the above example, it is determined by the mobile phone that the No.2 projection unit, the No.3 projection unit and the No.4 projection unit are not required to operate.

After step 1101 is completed, step 1102 is performed, in which the projection unit is adjusted to be in the standby state. Continuing to illustrate the above example, the mobile phone adjusts the No.2 projection unit, the No.3 projection unit and the No.4 projection unit from an operating state into the standby state.

Besides the first instruction for combining screens, the mobile phone may further respond to a second instruction for combining screens. In the following, the specific implementation of the projection method of the disclosure is illustrated in conjunction with a specific example.

Figure 15A:
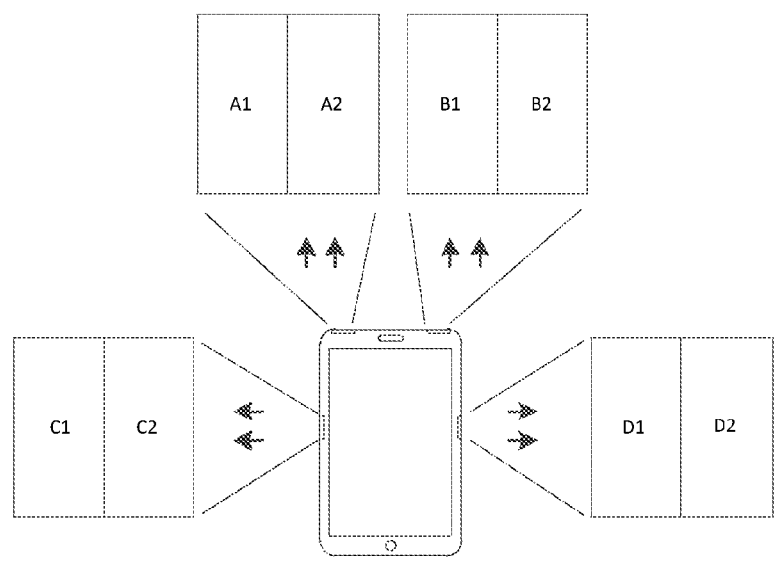
FIG. 15A-15D are schematic diagrams of a specific implementation of responding by the electronic device the second instruction for combining screens according to an embodiment of the disclosure.

Assumed that the operating mode of the No.1 projection unit 81 to the No. 4 projection unit 84 of the mobile phone is as follows, referring to FIG. 15A, the No.1 projection unit 81 projects a projection content including text region A1 and picture region A2 onto No.1 projection region 91, the No.2 projection unit 82 projects a projection content including text region B1 and picture region B2 onto No.2 projection region 92, the No.3 projection unit 83 projects a projection content including text region C1 and picture region C2 onto No.3 projection region 93, and the No.4 projection unit 84 projects a projection content including text region D1 and picture region D2 onto No.4 projection region 94.

Figure 15B:
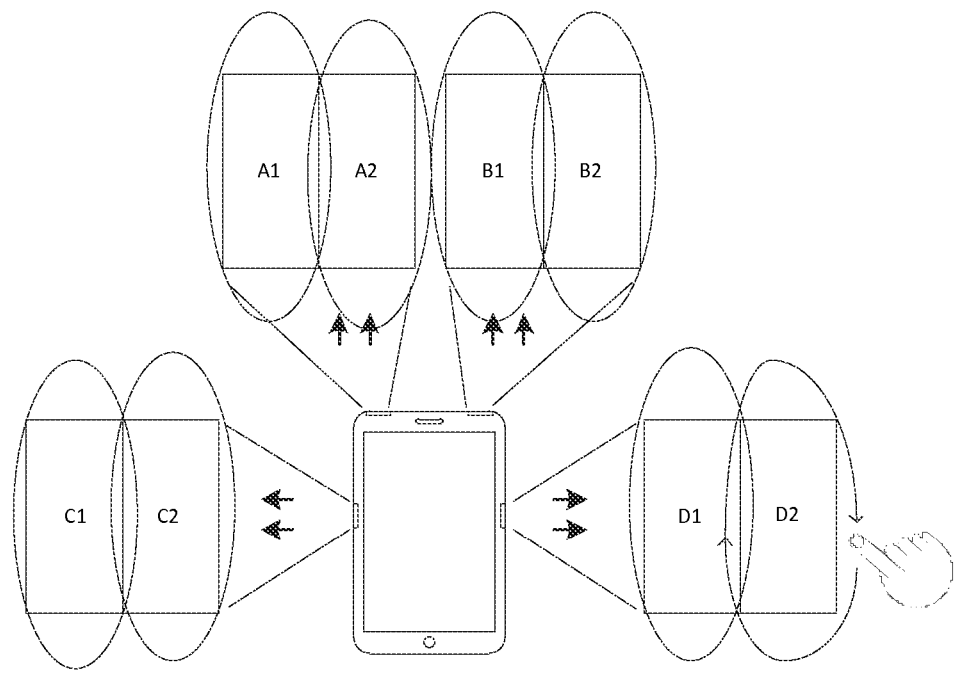

In this case, if the user desires to perform an operation for combining screens, step S101 is performed by the mobile phone, in which a first operation of the user is detected in the M projection regions. Continuing to illustrate the above example, referring to FIG. 15B, the first operation is detected by the mobile phone, that is, the text part and the picture part are selected respectively with circles in the region required to be combined, in which the circled text regions include A1, B1, C1 and D1, and the circled picture regions include A2, B2, C2 and D2.

After step 601 is completed, step 602 is performed, in which an instruction for splitting a screen or an instruction for combining screens is generated in response to the first operation. For example, step 1001 is performed by the mobile phone, in which the second instruction for combining screens is generated. Continuing to illustrate the above example, the instruction may be generated by a processor equipped inside the mobile phone.

After step 1001 is completed, step 1002 is performed, in which the number C of screens to be combined for a text region corresponding to the second instruction for combining screens and the number D of screens to be combined for a picture region corresponding to the second instruction for combining screens are acquired, where C and D are integers greater than or equal to zero and are not equal to zero. Continuing to illustrate the above example, the mobile phone acquires the number 4 of the screens to be combined for the text region and the number 4 of the screens to be combined for the picture region in response to the first operation.

After step 1002 is completed, step 1003 is performed, in which C text regions are combined into a text part and D picture regions are combined into a picture part, where the text part and the picture part are included in the M projection regions, the text part includes one or more of the M projection regions and the picture part includes one or more of the M projection regions; or the C text regions and the D picture regions are combined into a second projection region, where the projection region is included in the M projection regions. Continuing to illustrate the above example, four text regions of A1, B1, C1 and D1 are combined by the mobile phone into the text part which may correspond to a projection region, and four picture regions of A2, B2, C2 and D2 are combined by the mobile phone into the picture part which may correspond to a projection region.

Alternatively, the text part and the picture part are combined by the mobile phone into the second projection region, where the content of the text part is included in the left half of the second projection region, and the content of the picture part is included in the right half of the second projection region.

Figure 15C:
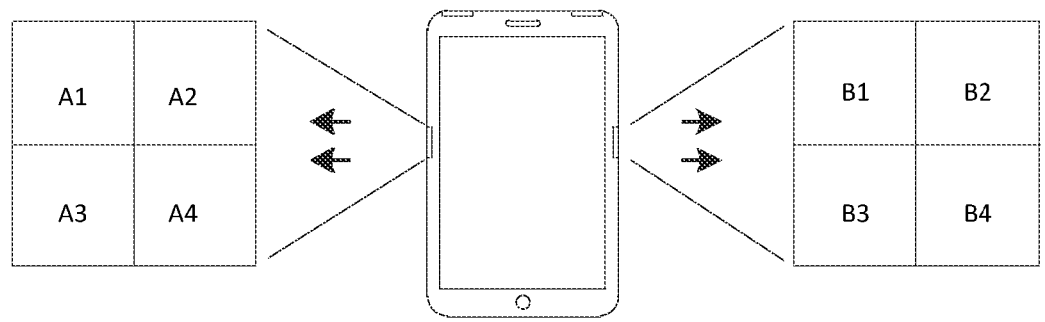

After step 1003 is completed, step S504 is performed, in which the text part and the picture part are rejected onto R projection regions corresponding to R projection units of the N projection units by using the R projection units based on the second instruction for combining screens, where R is an integer ranges from 2 to N; or the second projection region is rejected onto projection regions corresponding to R projection units of the N projection units by using the R projection units based on the second instruction for combining screens, where R is an integer ranges from 1 to N. Continuing to illustrate the above example, the mobile phone projects the text part and the picture part onto the projection regions corresponding to two projection units by using the two projection units. Specifically, referring to FIG. 15C, the mobile phone projects the text part onto the No.3 projection region 93 by using the No.3 projection unit 83, and projects the picture part onto the No.4 projection region 94 by using the No.4 projection unit 84.

Figure 15D:
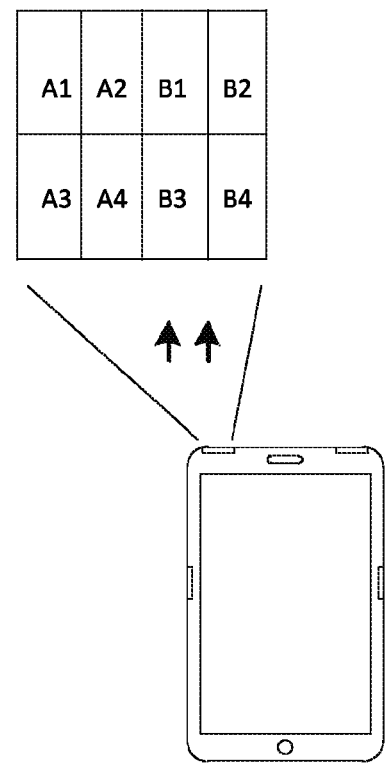

Alternatively, a projection content including the text part and the picture part is combined by the mobile phone into a second projection region, and the new projection content is projected onto the corresponding projection region by using a projection unit. Specifically, referring to FIG. 15D, four text regions of A1, B1, C1 and D1 are combined by the mobile phone into the text part, and four picture regions of A2, B2, C2 and D2 are combined by the mobile phone into the picture part, and then the text part and the picture part are projected together onto the No.1 projection region 91 by using the No.1 projection unit 81.

The way of projection is not unique, and the projection unit required to operate may be assigned automatically by an algorithm preset in the mobile phone, or the projection unit may be adjusted by the user according to the needs of the user. Moreover, the size of each split projection sub-content may be determined by a preset algorithm, or may be adjusted automatically based on the size of the projection region, or the size of the original projection sub-region may not be changed. For example, the text part may be projected onto the No.1 projection region 91 and the picture part may be projected onto the No.2 projection region 92, for which the specific implementation is not described any more herein.

Figure 16:
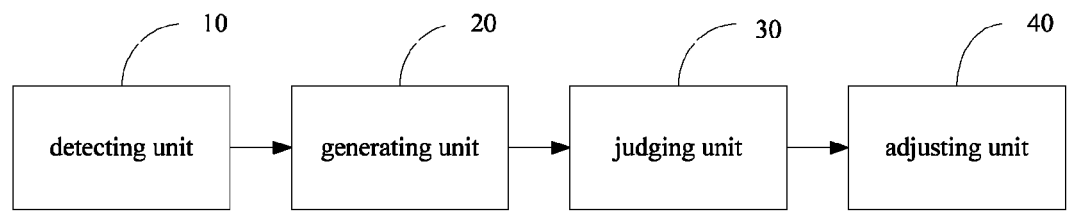
FIG. 16 is a structural diagram of an electronic device according to an embodiment of the disclosure.

Referring to FIG. 16, an electronic device is further provided according to an embodiment of the disclosure. The electronic device are provided with N projection units and the N projection units are capable of projecting M projection contents in M projection regions, where N is an integer greater than or equal to 2 and M is an integer ranges from 1 to N, and the electronic device includes a detection unit 10 and a generating unit 20.

The detection unit 10 is configured to detect a first operation of a user in the M projection regions.

The generating unit 20 is configured to generate an instruction for splitting a screen or an instruction for combining screens in response to the first operation.

The instruction for splitting a screen is used to control the electronic device to project and output a first projection content in a first projection region onto P projection regions, the first projection region is included in the M projection regions and the first projection region is determined based on the first operation, where P is an integer less than or equal to M.

The instruction for combining screens is used to control the electronic device to combine K projection contents in the M projection regions and project and output the combined projection content onto a second projection region, the second projection region is included in the M projection regions and the second projection region is determined based on the first operation, where K is an integer ranges from 2 to M.

Optionally, the generating unit 20 may include:
a first generating module, configured to generate a first instruction for splitting a screen;
a first acquisition module, configured to acquire the number K of split screens for the first instruction for splitting a screen, where K is an integer greater than or equal to 2;
a first splitting module, configured to split the first projection content into K projection sub-contents; and
a first executing module, configured to project the K projection sub-contents onto the P projection regions by using X projection units of the N projection units based on the first instruction for splitting a screen, where X is an integer ranges from 2 to N, and the P projection regions are included in the M projection regions.

Optionally, the generating unit 20 may include:
a second generating module, configured to generate a second instruction for splitting a screen;
a second acquisition module, configured to acquire the number A of split screens for a text region in the first projection content corresponding to the second instruction for splitting a screen and the number B of split screens for a picture region in the first projection content corresponding to the second instruction for splitting a screen, where A and B are integers greater than or equal to 1;
a second splitting module, configured to split the text region into A text sub-regions and split the picture region into B picture sub-regions; and
a second executing module, configured to project the A text sub-regions and the B picture sub-regions onto the P projection regions by using Y projection units of the N projection units based on the second instruction for splitting a screen, where Y is an integer ranges from 2 to N, and the P projection regions are included in the M projection regions.

Optionally, the generating unit 20 may include:
a third generating module, configured to generate a first instruction for combining screens;
a third acquisition module, configured to acquire the number Q of screens to be combined for the first instruction for combining screens, where Q is an integer greater than or equal to 2;
a first combining module, configured to combine Q projection regions into a second projection region, where the second projection region is included in the M projection regions; and
a third executing module, configured to project the second projection region onto projection regions corresponding to Z projection units of the N projection units by using the Z projection units based on the first instruction for combining screens, where Z is an integer ranges from 1 to N.

Optionally, the generating unit 20 may include:
a fourth generating module, configured to generate a second instruction for combining screens;
a fourth acquisition module, configured to acquire the number C of screens to be combined for a text region corresponding to the second instruction for combining screens and the number D of split screens for a picture region corresponding to the second instruction for splitting a screen, where C and D are integers greater than or equal to zero and are not equal to zero;
a second combining module, configured to combine C text regions into a text part and combine D picture regions into a picture part, where the text part and the picture part are included in the M projection regions, the text part includes one or more of the M projection regions and the picture part includes one or more of the M projection regions; or combine the C text regions and the D picture regions into a second projection region, where the projection region is included in the M projection regions; and
a fourth executing module, configured to project the text part and the picture part onto projection regions corresponding to R projection units of the N projection units by using the R projection units based on the second instruction for combining screens, where R is an integer ranges from 2 to N; or project the second projection region onto R projection regions corresponding to R projection units of the N projection units by using the R projection units based on the second instruction for combining screens, where R is an integer ranges from 1 to N.

Optionally, the electronic device may further include a judgment unit 30 and an adjustment unit 40.

The judgment unit 30 is configured to judge whether there is at least one projection unit which is not required to operate in the N projection units, after the instruction for splitting a screen or the instruction for combining screens is generated.

The adjustment unit 40 is configured to adjust the projection unit to be in a standby state.

The above electronic device has a one-to-one correspondence with the projection method described above, which is not repeated any more herein.

With one or more technical solutions according to the embodiments of the disclosure, one or more technical effects as follows may be achieved.

In the technical solutions according to the embodiments of the disclosure, a gesture operation performed by the user on the projection unit is detected and acquired, and the electronic device adjusts the projection unit to combine or split the projection content in response to the gesture operation of the user. Compared with the problem that the projection unit may not be operated by a gesture, according to the technical solutions of the embodiments of the disclosure, the problem that an operation for combining screens or an operation for splitting a screen performed by the user may not be responded by the electronic device can be solved effectively, and therefore the electronic device can respond to an operation for combining screens or an operation for splitting a screen performed by the user.

It should be understood by those skilled in the art that a method, system or computer program product may be provided according to the embodiments of the disclosure. The disclosure may take the form of an entirely hardware embodiment, an entirely software embodiment or an embodiment including both hardware and software elements. Moreover, the disclosure may take the form of a computer program product embodied in one or more computer-readable storage mediums (including but not limited to a magnetic-disk memory, a CD-ROM, an optical memory) in which computer-readable program codes are included.

The present disclosure has been described with reference to flow diagrams and/or block diagrams of methods, apparatus (systems), and computer program products according to embodiments of the disclosure. It should be understood that each flow and/or block of the flow diagrams and/or block diagrams, and combinations of flows and/or blocks in the flow diagrams and/or block diagrams, can be implemented by computer program instructions. These computer program instructions may be provided to a processor of a general purpose computer, special purpose computer, embedded processor or a processor of other programmable data processing apparatus to produce a machine, such that the instructions, which execute via the processor of the computer or other programmable data processing apparatus, create means for implementing the functions specified in the flow diagram, one flow or flows and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flow diagram flow or flows and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flow diagram flow or flows and/or block diagram block or blocks.

Specifically, computer program instructions corresponding to the projection method according to the embodiment of the disclosure may be stored in the storage medium such as an optical disk, a hard disk or a USB flash disk. The computer program instructions corresponding to the information processing method stored in the storage medium, when being read or executed by an electronic device, may include:

detecting a first operation of the user in the M projection regions; and generating an instruction for splitting a screen or an instruction for combining screens in response to the first operation, where the instruction for splitting a screen is used to control the electronic device to project and output a first projection content in a first projection region onto P projection regions, the first projection region is included in the M projection regions and the first projection region is determined based on the first operation, where P is an integer less than or equal to M, and the instruction for combining screens is used to control the electronic device to combine K projection contents in the M projection regions and project and output the combined projection content onto a second projection region, the second projection region is included in the M projection regions and the second projection region is determined based on the first operation, where K is an integer ranges from 2 to M.

Optionally, a computer instruction stored in the storage medium corresponding to the step of generating an instruction for splitting a screen, when executed, may include:

generating an instruction for splitting a screen;

acquiring the number K of split screens for the first instruction for splitting a screen, where K is an integer greater than or equal to 2;

splitting the first projection content into K projection sub-contents; and projecting the K projection sub-contents onto the P projection regions by using X projection units of the N projection units based on the first instruction for splitting a screen, where X is an integer ranges from 2 to N, and the P projection regions are included in the M projection regions.

Optionally, a computer instruction stored in the storage medium corresponding to the step of generating an instruction for splitting a screen, when executed, may include:

generating a second instruction for splitting a screen;

acquiring the number A of split screens for a text region in the first projection content corresponding to the second instruction for splitting a screen and the number B of split screens for a picture region in the first projection content corresponding to the second instruction for splitting a screen, where A and B are integers greater than or equal to 1;

splitting the text region into A text sub-regions and splitting the picture region into B picture sub-regions; and projecting the A text sub-regions and the B picture sub-regions onto the P projection regions by using Y projection units of the N projection units based on the second instruction for splitting a screen, where Y is an integer ranges from 2 to N, and the P projection regions are included in the M projection regions.

Optionally, a computer instruction stored in the storage medium corresponding to the step of generating an instruction for combining screens, when executed, may include:

generating a first instruction for combining screens;
acquiring the number Q of screens to be combined for the first instruction for combining screens, where Q is an integer greater than or equal to 2;
combining Q projection regions corresponding to the first instruction for combining screens into a second projection region, where the second projection region is included in the M projection regions; and
projecting the second projection region onto projection regions corresponding to Z projection units of the N projection units by using the Z projection units based on the first combining screens, where Z is an integer ranges from 1 to N.

Optionally, a computer instruction stored in the storage medium corresponding to the step of generating an instruction for combining screens, when executed, may include:
generating a second instruction for combining screens;
acquiring the number C of screens to be combined for a text region corresponding to the second instruction for combining screens and the number D of split screens for a picture region corresponding to the second instruction for splitting a screen, where C and D are integers greater than or equal to zero and are not equal to zero;
combining C text regions into a text part and combining D picture regions into a picture part, where the text part and the picture part are included in the M projection regions, the text part includes one or more of the M projection regions and the picture part includes one or more of the M projection regions;
projecting the text part and the picture part onto projection regions corresponding to R projection units of the N projection units by using the R projection units based on the second instruction for combining screens, where R is an integer ranges from 2 to N; or
combining the C text regions and the D picture regions into a second projection region, where the projection region is included in the M projection regions; and
projecting the second projection region onto R projection regions corresponding to R projection units of the N projection units by using the R projection units based on the second instruction for combining screens, where R is an integer ranges from 1 to N.

Optionally, the computer program instructions may further include, after a computer instruction stored in the storage medium corresponding to the step of generating an instruction for splitting a screen or an instruction for combining screens is executed:
determining whether there is at least one projection unit which is not required to operate in the N projection units; and
adjusting the projection unit to be in a standby state.

Optionally, a computer instruction stored in the storage medium corresponding to the step of projecting the first projection content by using the second projection unit, when executed, may include: projecting the first projection content by using the second projection unit, and projecting the second projection content by using the first projection unit.

As described above, the technical solutions of the disclosure are introduced in details according to the above embodiments of the disclosure, but the description of the embodiments above only is used to aid the reader in understanding the method according to the disclosure and the core concepts of the disclosure and the scope of the disclosure will not be limited thereto. Any variations or substitutions which can readily occur to those skilled in the art without departing from the spirit of the disclosure shall come into the scope of the disclosure.

What is claimed is:

1. A projection method comprising:
projecting a first projection content from a first projection unit;
judging whether a second projection content is being projected by a second projection unit;
stopping projection of the second projection content from the second projection unit if the second projection content is being projected by the second projection unit;
stopping projection of the first projection content from the first projection unit; and
projecting a combined projection content from the second projection unit, wherein the combined projection content is a combination of the first projection content and the second projection content.

2. The method according to claim 1, further comprising:
generating an instruction for splitting a screen in response to a first operation; and
projecting the combined projection content from the second projection unit onto a plurality of projection regions in response to the instructions for splitting the screen.

3. The method according to claim 2, wherein the projecting of the combined projection content from the second projection unit onto the plurality of projection regions in response to the instruction for splitting the screen comprises:
acquiring a text part and a picture part of the first projection content;
projecting the text part of the first projection content from the second projection unit onto the plurality of projection regions; and
projecting the picture part of the first projection content from the second projection unit onto the plurality of projection regions.

4. The method according to claim 1, wherein if the first projection unit projects the first projection content onto a plurality of projection regions, the projecting of the first projection content from the second projection unit comprises:
generating an instruction for combining screens in response to a first operation; and
projecting the first projection content from the second projection unit onto a single projection region.

5. The method according to claim 4, wherein the projecting the first projection content from the second projection unit onto the single projection region comprises:
acquiring a text part and a picture part of the first projection content; and
projecting the text part and the picture part from the second projection unit onto the single projection region.

6. An electronic device comprising:
a processor; and
a plurality of projection units comprising a first projection unit and a second projection unit, wherein the first projection unit is operable to project a first projection content, and
wherein the processor is operable to judge whether a second projection content is being projected by the second projection unit,
stop projection of the second projection content from the second projection unit if the second projection content is being projected by the second projection unit, stop projection of the first projection content from the first projection unit, and project a combined projection content from the second projection unit, wherein the combined projection content is a combination of the first projection content and the second projection content.

7. The electronic device according to claim 6, wherein the processor is further operable:

to generate an instruction for splitting a screen in response to a first operation; and to project the combined projection content from the second projection unit onto a plurality of projection regions in response to the instruction for splitting the screen.

8. The electronic device according to claim 7, wherein the processor is operable:

to acquire a text part and a picture part of the first projection content;

to project the text part of the first projection content from the second projection unit onto the plurality of projection regions; and to project the picture part of the first projection content from the second projection unit onto the plurality of projection regions.

9. The electronic device according to claim 6, wherein if the first projection unit projects the first projection content onto a plurality of projection regions, the processor is operable:

to generate an instruction for combining screens in response to a first operation; and to project the first projection content from the second projection unit onto a single projection region.

10. The electronic device according to claim 9, wherein the processor is operable:

to acquire a text part and a picture part of the first projection content; and to project the text part and the picture part from the second projection unit onto the single projection region.

* * * * *